US011088829B2

(12) United States Patent
Driever et al.

(10) Patent No.: US 11,088,829 B2
(45) Date of Patent: *Aug. 10, 2021

(54) SECURING A PATH AT A NODE

(71) Applicant: INTERNATIONAL BUSINESS MACHINES CORPORATION, Armonk, NY (US)

(72) Inventors: Patricia G. Driever, Poughkeepsie, NY (US); Roger G. Hathorn, Tucson, AZ (US); Christopher Colonna, Ossining, NY (US); John Flanagan, Poughkeepsie, NY (US); George P. Kuch, Poughkeepsie, NY (US); Richard M. Sczepczenski, Hyde Park, NY (US); Glen Jaquette, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 208 days.

This patent is subject to a terminal disclaimer.

(21) Appl. No.: 16/121,050

(22) Filed: Sep. 4, 2018

(65) Prior Publication Data
US 2020/0076582 A1    Mar. 5, 2020

(51) Int. Cl.
*H04L 9/08*    (2006.01)
*H04L 9/14*    (2006.01)
*H04L 29/06*   (2006.01)

(52) U.S. Cl.
CPC .............. *H04L 9/0819* (2013.01); *H04L 9/14* (2013.01); *H04L 63/061* (2013.01); *H04L 2209/24* (2013.01)

(58) Field of Classification Search
CPC ....... H04L 9/14; H04L 9/3247; H04L 9/0894; H04L 9/3263; H04L 9/083; H04L 63/061;
(Continued)

(56) References Cited

U.S. PATENT DOCUMENTS 5,706,347 A  1/1998 Burke et al.
6,256,740 B1 7/2001 Muller et al.
(Continued)

FOREIGN PATENT DOCUMENTS

CN  106790261 A    5/2017
EP    2294850 B1    11/2011
(Continued)

OTHER PUBLICATIONS

IP Encapsulating Security Payload (ESP). RFC 4303. Dec. 2005. (Year: 2005).*

(Continued)

*Primary Examiner* — Robert B Leung
(74) *Attorney, Agent, or Firm* — Steven Chiu, Esq.; Blanche E. Schiller, Esq.; Heslin Rothenberg Farley & Mesiti P.C.

(57) ABSTRACT

A path for a node of a computing environment is secured. The securing includes obtaining, by the node, a message that includes an identifier of a shared key and an encrypted message, the encrypted message including a first encryption key, a second encryption key, one or more first parameters and one or more second parameters. The node obtains the shared key from a key server and uses it to decrypt the encrypted message to obtain the first encryption key, the second encryption key, the one or more first parameters and the one or more second parameters. A second security parameters index, to be associated with the second encryption key and the one or more second parameters, is obtained. The node sends a response message to another node, the response message including the second security parameters index.

20 Claims, 17 Drawing Sheets

(58) Field of Classification Search
CPC .............. H04L 63/062; H04L 63/0428; H04L 63/0823; H04L 9/0819
See application file for complete search history.

(56) References Cited

U.S. PATENT DOCUMENTS

| | | | |
|---|---|---|---|
| 6,263,445 B1 | 7/2001 | Blumenau | |
| 6,973,568 B2 | 12/2005 | Hagerman | |
| 7,096,355 B1* | 8/2006 | Marvit | H04L 63/0428 380/264 |
| 7,287,269 B2 | 10/2007 | Burton et al. | |
| 7,310,813 B2 | 12/2007 | Lin et al. | |
| 7,760,882 B2 | 7/2010 | Tidwell et al. | |
| 7,965,843 B1 | 6/2011 | Maino et al. | |
| 8,005,227 B1 | 8/2011 | Linnell et al. | |
| 8,281,386 B2 | 10/2012 | Milligan et al. | |
| 8,285,993 B1 | 10/2012 | Subramanian et al. | |
| 8,335,915 B2 | 12/2012 | Plotkin et al. | |
| 8,379,857 B1* | 2/2013 | Zheng | H04L 9/0833 380/255 |
| 8,494,168 B1 | 7/2013 | Tolfmans | |
| 8,621,567 B2 | 12/2013 | Kleinsteiber et al. | |
| 8,625,623 B2 | 1/2014 | Saklecha et al. | |
| 8,750,311 B2 | 6/2014 | Ayandeh | |
| 8,751,804 B1 | 6/2014 | Nyström et al. | |
| 8,830,836 B1 | 9/2014 | de la Iglesia et al. | |
| 8,832,234 B1 | 9/2014 | Brooker et al. | |
| 8,850,205 B2 | 9/2014 | Choi et al. | |
| 8,886,934 B2 | 11/2014 | Eckert et al. | |
| 8,913,751 B2 | 12/2014 | Du et al. | |
| 9,071,424 B1 | 6/2015 | Bowness | |
| 9,106,641 B1 | 8/2015 | Hufferd | |
| 9,148,412 B2 | 9/2015 | Hofer | |
| 9,172,590 B2 | 10/2015 | Willeke et al. | |
| 9,210,100 B2 | 12/2015 | Val Der Linden et al. | |
| 9,438,479 B1 | 9/2016 | Friedman et al. | |
| 9,548,888 B1 | 1/2017 | Fair et al. | |
| 9,571,278 B1 | 2/2017 | Harwood et al. | |
| 9,742,564 B2 | 8/2017 | Moffat et al. | |
| 9,785,785 B2 | 10/2017 | O'Hare et al. | |
| 9,792,076 B2 | 10/2017 | Lam et al. | |
| 9,853,873 B2 | 12/2017 | Dasu et al. | |
| 9,864,874 B1 | 1/2018 | Shanbhag | |
| 2004/0005061 A1 | 1/2004 | Buer | |
| 2004/0165726 A1 | 8/2004 | Yamamichi | |
| 2004/0257857 A1 | 12/2004 | Yamamoto et al. | |
| 2006/0010324 A1* | 1/2006 | Appenzeller | H04L 9/083 713/171 |
| 2007/0255954 A1 | 11/2007 | Struik | |
| 2009/0316911 A1* | 12/2009 | Cho | H04L 9/14 380/284 |
| 2010/0031061 A1 | 2/2010 | Watanabe | |
| 2011/0026714 A1* | 2/2011 | Thomas | G06F 21/57 380/278 |
| 2012/0011360 A1 | 1/2012 | Engels et al. | |
| 2012/0076300 A1 | 3/2012 | Uchida | |
| 2012/0290627 A1 | 11/2012 | Moram et al. | |
| 2013/0173903 A1 | 7/2013 | Obligacion | |
| 2013/0173910 A1 | 7/2013 | Hong | |
| 2014/0369498 A1 | 12/2014 | Hammersmith | |
| 2014/0372750 A1* | 12/2014 | Antonenkov | G06F 21/31 713/165 |
| 2015/0127946 A1 | 5/2015 | Miller et al. | |
| 2016/0043870 A1 | 2/2016 | Avanzi | |
| 2016/0112381 A1 | 4/2016 | Bhattacharyya | |
| 2016/0259561 A1 | 9/2016 | Hong et al. | |
| 2016/0360402 A1 | 12/2016 | Park | |
| 2017/0017957 A1 | 1/2017 | Radu | |
| 2017/0083565 A1 | 3/2017 | Gupta et al. | |
| 2017/0222994 A1 | 8/2017 | Keidar | |
| 2017/0257352 A1 | 9/2017 | Revell | |
| 2017/0317918 A1 | 11/2017 | Vemula et al. | |
| 2017/0317991 A1 | 11/2017 | Lionetti | |
| 2017/0338948 A1 | 11/2017 | Boehl | |
| 2018/0191501 A1 | 7/2018 | Lindemann | |
| 2018/0309734 A1* | 10/2018 | Yu | G06F 21/606 |
| 2018/0343258 A1* | 11/2018 | Spies | H04L 63/101 |
| 2019/0020933 A1 | 1/2019 | Bieber | |

FOREIGN PATENT DOCUMENTS

| | | |
|---|---|---|
| GB | 2471282 A | 12/2010 |
| JP | 4803145 B2 | 10/2011 |
| JP | 2016103048 A | 6/2016 |
| KR | 101300844 B1 | 8/2013 |
| KR | 101726243 B1 | 4/2017 |
| WO | 2018002626 A1 | 1/2018 |

OTHER PUBLICATIONS

Mell, P., et al., "The NIST Definition of Cloud Computing," National Institute of Standards and Technology, Information Technology Laboratory, Special Publication 800-145, Sep. 2011, pp. 1-7.
"Fibre Channel Security Protocols-2 (FC-SP-2)", Secretariat—Information Technology Industry Council, American National Standards Institute, Inc., Rev. 2.71, pp. 1-312, Jun. 12, 2012.
"Fibre Channel Link Services—(FC-LS-3)", Secretariat—Information Technology Industry Council, American National Standards Institute, Inc., Rev. 3.53, pp. 1-232, Feb. 2, 2017.
Kaufman, C., et al., "Internet Key Exchange Protocol Version 2 (IKEv2)", Internet Engineering Task Force, pp. 1-138, Sep. 2010.
Ferreira, R., et al., "Recognizing Entities Across Protocols with Unified UUID Discovery and Asymmetric Keys", Global Communications Conference (GlobeCom), IEEE, pp. 1-7, Dec. 2013.
Jose, M.V., et al., "Enhancing Security in Resource Sharing Using Key Holding Mechanism", World Academy of Science, Engineering and Technology, International Journal of Computer, Information Systems and Control Engineering, vol. 8, No. 10, Aug. 2014, pp. 1892-1898.
McGowan, J., et al., "SAN Security", Computer and Information Security Handbook, $2^{nd}$ Edition, Elsevier Inc., Chapter e51, pp. e61-e83, 2013 (no further date information available).
Tysowski, P.K., et al., "The Engineering of a Scalable Multi-Site Communications System Utilizing Quantum Key Distribution (QKD)", Quantum Science and Technology, vol. 3, No. 2, pp. 1-34, Dec. 2017.
Walenta, N., et al., "Practical aspects of security certification for commercial quantum technologies", Electro-Optical and Infrared Systems: Technology and Applications XII; and Quantum Information Science and Technology, vol. 9648, Oct. 2015, pp. 1-11.
List of IBM Patents or Patent Applications Treated as Related, Jan. 10, 2019, pp. 1-2.
Driever, Patricia G. et al., "Controlling Access Between Nodes by a Key Server," U.S. Appl. No. 16/120,894, filed Sep. 4, 2018, pp. 1-62.
Driever, Patricia G. et al., "Shared Key Processing by a Host to Secure Links," U.S. Appl. No. 16/120,933, filed Sep. 4, 2018, pp. 1-65.
Driever, Patricia G. et al., "Securing a Storage Network Using Key Server Authentication," U.S. Appl. No. 16/120,975, filed Sep. 4, 2018, pp. 1-64.
Driever, Patricia G. et al., "Shared Key Processing by a Storage Device to Secure Links," U.S. Appl. No. 16/120,006, filed Sep. 4, 2018, pp. 1-63.
Driever, Patricia G. et al., "Securing a Path at a Selected Node," U.S. Appl. No. 16/121,026, filed Sep. 4, 2018, pp. 1-64.
Driever, Patricia G. et al., "Storage Device Key Management for Encrypted Host Data," U.S. Appl. No. 16/121,076, filed Sep. 4, 2018, pp. 1-44.
Driever, Patricia G. et al., "Automatic Re-Authentication of Links Using a Key Server," U.S. Appl. No. 16/121,097, filed Sep. 4, 2018, pp. 1-60.

* cited by examiner

SECURE A PATH FOR ONE NODE OF THE COMPUTING ENVIRONMENT ~ 700

THE SECURING THE PATH INCLUDES

OBTAINING, BY THE ONE NODE, A MESSAGE, THE MESSAGE INCLUDING AN IDENTIFIER OF A SHARED KEY AND AN ENCRYPTED MESSAGE, THE ENCRYPTED MESSAGE INCLUDING A FIRST ENCRYPTION KEY, A SECOND ENCRYPTION KEY, ONE OR MORE FIRST PARAMETERS AND ONE OR MORE SECOND PARAMETERS ~ 702

OBTAINING, BY THE ONE NODE, THE SHARED KEY FROM A KEY SERVER COUPLED TO THE ONE NODE, THE ONE NODE HAVING A SECURE CONNECTION WITH THE KEY SERVER ~ 704

USING THE SHARED KEY TO DECRYPT THE ENCRYPTED MESSAGE TO OBTAIN THE FIRST ENCRYPTION KEY, THE SECOND ENCRYPTION KEY, THE ONE OR MORE FIRST PARAMETERS AND THE ONE OR MORE SECOND PARAMETERS ~ 706

OBTAINING A SECOND SECURITY PARAMETERS INDEX TO BE ASSOCIATED WITH THE SECOND ENCRYPTION KEY AND THE ONE OR MORE SECOND PARAMETERS ~ 708

SENDING BY THE ONE NODE A RESPONSE MESSAGE TO ANOTHER NODE, THE RESPONSE MESSAGE INCLUDING THE SECOND SECURITY PARAMETERS INDEX, IN WHICH A SECURE PATH OVER A LINK COUPLING THE ONE NODE AND THE OTHER NODE IS PROVIDED ~ 710

THE SECURING THE PATH FURTHER INCLUDES ESTABLISHING BY THE ONE NODE THE SECURE CONNECTION WITH THE KEY SERVER, THE ESTABLISHING THE SECURE CONNECTION USING ONE OR MORE CERTIFICATES OF AUTHENTICATION ~ 712

AT LEAST ONE CERTIFICATE OF AUTHENTICATION INCLUDES A NAME ASSOCIATED WITH THE ONE NODE TO ENABLE THE KEY SERVER TO TRUST THE ONE NODE ~ 714

FIG. 7A

THE ONE OR MORE FIRST PARAMETERS INCLUDE A FIRST SALT AND A FIRST SECURITY PARAMETERS INDEX — 720

THE ONE OR MORE SECOND PARAMETERS INCLUDE A SECOND SALT — 722

THE SECURING THE PATH FURTHER INCLUDES USING THE SECOND ENCRYPTION KEY AND THE SECOND SALT TO TRANSMIT SUBSEQUENT DATA — 724

THE SECURING THE PATH FURTHER INCLUDES ENCRYPTING THE RESPONSE MESSAGE USING THE SHARED KEY — 726

THE SECURING THE PATH FURTHER INCLUDES RECEIVING A REPLY TO THE RESPONSE MESSAGE — 728

THE SECURING THE PATH FURTHER INCLUDES USING THE FIRST ENCRYPTION KEY AND THE ONE OR MORE FIRST PARAMETERS TO DECRYPT RECEIVED DATA — 730

THE USING THE SHARED KEY INCLUDES USING THE SHARED KEY IN A CRYPTOGRAPHIC TECHNIQUE TO DECRYPT THE ENCRYPTED MESSAGE — 732

FIG. 7B

SECURING A PATH AT A NODE

BACKGROUND

One or more aspects relate, in general, to providing security within computing environments, and in particular, to performing authentication for nodes that communicate with one another via encrypted messages.

Encryption provides data security for data and/or other information being transmitted between two entities, such as a source node and a target node coupled via a plurality of endpoints or links. To standardize aspects of encryption, various standards are provided for different types of communication protocols. For instance, the FC-SP-2 and FC-LS-3 standards are provided for Fibre Channels.

The FC-SP-2 standard, as an example, used for encrypting Fibre Channel links includes protocols for mutual authentication of two endpoints, as well as protocols for negotiating encryption keys that are used in communication sessions between the two endpoints. The standard provides support for a variety of mechanisms to authenticate the involved parties, as well as mechanisms by which key material is provided or developed. The standard is defined for several authentication infrastructures, including secret-based, certificate-based, password-based, and pre-shared key based, as examples.

Generally, a certificate-based infrastructure is considered to provide a strong form of secure authentication, as the identity of an endpoint is certified by a trusted Certificate Authority. The FC-SP-2 standard defines a mechanism by which multiple certified entities can use the public-private key pairs that the certificate binds them to in order to authenticate with each other. This authentication occurs directly between two entities through the use of the Fibre Channel Authentication protocol (FCAP), the design of which is based on authentication that uses certificates and signatures as defined in, for instance, the Internet Key Exchange (IKE) protocol.

However, the exchange and validation of certificates inline is compute intensive, as well as time-consuming. The FCAP protocol is also performed on every Fibre Channel link between the entities. Since it is to be done before any client traffic flows on the links that are to be integrity and/or security protected, it can negatively impact (elongate) the link initialization times, and hence, the time it takes to bring up and begin executing client workloads. The IKE protocol also involves fairly central processing unit intensive mathematical computations, and in an environment that includes large enterprise servers with a large number of Fibre Channel physical ports in a dynamic switched fabric connected to a large number of storage controller ports, the multiplier effect of these computations and the high volume of frame exchanges to complete the IKE protocol can also negatively affect system initialization and cause constraints in heavy normal operation.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes securing a path for one node of the computing environment. The securing the path includes obtaining, by the one node, a message, the message including an identifier of a shared key and an encrypted message, the encrypted message including a first encryption key, a second encryption key, one or more first parameters and one or more second parameter. Further, the one node obtains the shared key from a key server coupled to the one node, the one node having a secure connection with the key server. The shared key is used to decrypt the encrypted message to obtain the first encryption key, the second encryption key, the one or more first parameters and the one or more second parameters. Moreover, in one example, a second security parameters index, to be associated with the second encryption key and the one or more second parameters, is obtained. The one node sends a response message to another node, the response message including the second security parameters index, wherein a secure path over a link coupling the one node and the other node is provided.

Authentication on a plurality of links between two nodes is performed without having to repeatedly obtain the shared key (e.g., wrapping key). This provides trust between the nodes and facilitates authentication of the links coupling the nodes. Messages communicated on the links may use the shared key for authentication without having to repeatedly obtain the shared key from a key server or directly between the nodes. This reduces processing time, and increases system performance. Link initialization times are also decreased, increasing efficiency in commencing client workloads and increasing system performance.

In one embodiment, the securing the path further includes establishing by the one node the secure connection with the key server, the establishing the secure connection using one or more certificates of authentication. At least one certificate of authentication includes, for instance, a name associated with the one node to enable the key server to trust the one node. By establishing the secure connection with the key server one time for a node, system performance is improved by reducing the time it takes to exchange and validate the certificates.

As examples, the one or more first parameters include a first salt and a first security parameters index, and the one or more second parameters include a second salt.

Further, in one embodiment, the securing the path includes using the second encryption key and the second salt to transmit subsequent data. The securing the path further includes, in one or more embodiments, encrypting the response message using the shared key, and receiving a reply to the response message. The securing the path further includes, in one embodiment, using the first encryption key and the one or more first parameters to decrypt received data.

As an example, the using the shared key includes using the shared key in a cryptographic technique to decrypt the encrypted message.

Computer-implemented methods and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 7A-7B depict further details of one embodiment of facilitating processing within a computing environment, in accordance with an aspect of the present invention;

DETAILED DESCRIPTION

Figure 1:
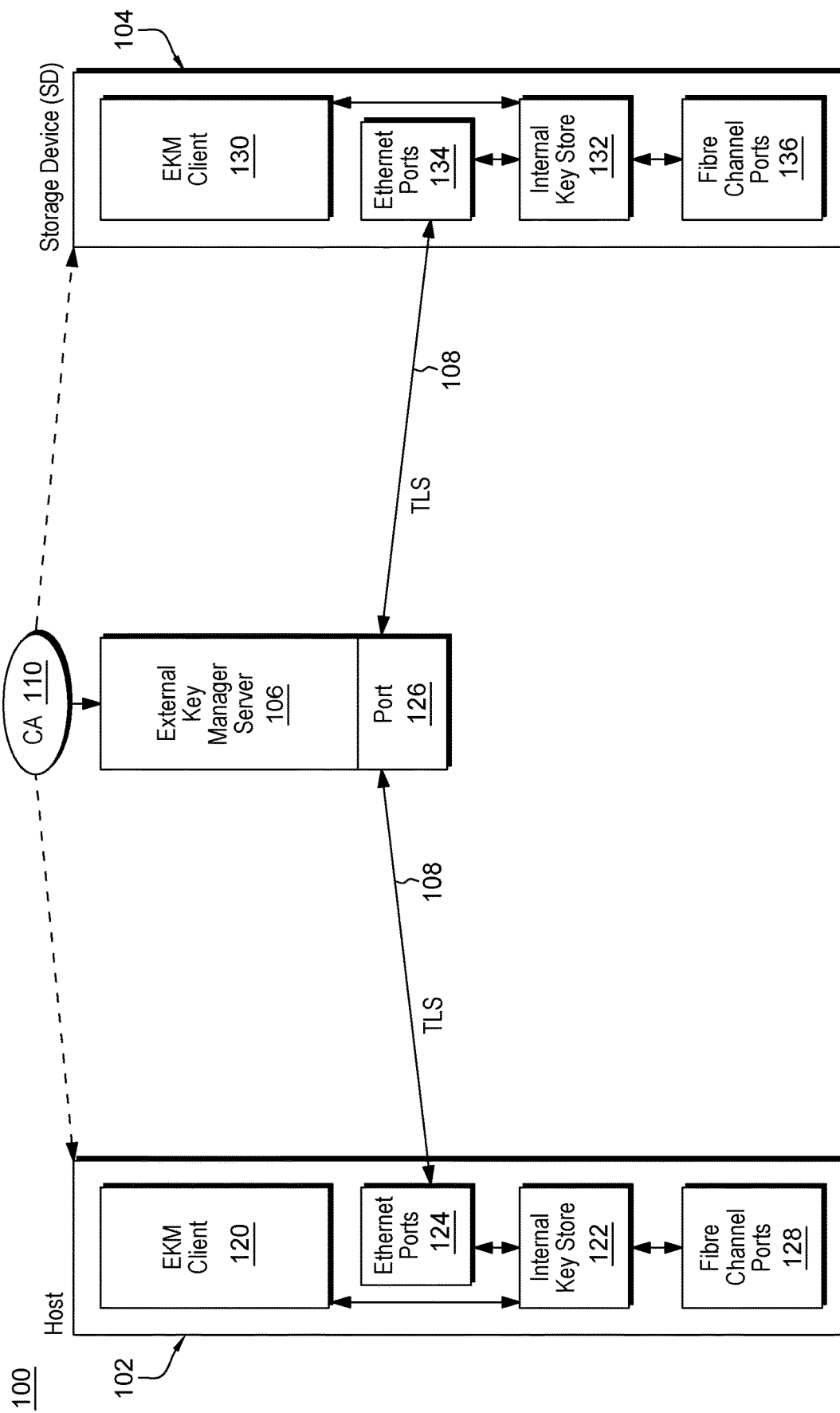
FIG. 1 depicts one example of a computing environment to incorporate and use one or more aspects of the present invention.

In one or more aspects, authentication is performed using certificates out-of-band using an external key manager in order to not impact link initialization times. As part of authentication, the external key manager provides for distribution of a shared key, referred to herein as a wrapping key, to each node (e.g., host, storage device) for use in communication with one another. The wrapping key is used to transmit additional information, such as key information, between the trusted endpoints of the nodes. This additional key information includes, for instance, transmit (a.k.a., send) and receive keys used in the encryption/decryption of data.

Authentication, via the external key manager, between the trusted nodes that share multiple links is performed once, instead of on a link by link basis. The ability of both entities to receive a wrapping key (e.g., a symmetric key) as trusted entities of the external key manager and to use it to encrypt/decrypt messages between them proves mutual authentication. Further, secure communication across all links (or selected links) connecting them is provided without additional accesses to the external key manager. Instead, the previously obtained wrapping key is used in communications between the trusted nodes on other links coupling the nodes providing authentication of the links, without having to re-authenticate the trusted nodes via the external key manager.

One example of a computing environment to include one or more aspects of the present invention is described with reference to FIG. 1. In one example, a computing environment 100 includes at least one node (e.g., host 102) and at least one other node (e.g., storage device (SD) 104) coupled to an external key manager server 106 (also referred to herein as external key server, key server, external key manager (EKM), as examples) via one or more connections 108. As an example, one or more connections 108 are Ethernet connections protected with a Transport Layer Security (TLS) secure communication. Further, in one example, host 102, storage device 104 and external key manager server 106 are coupled to a Certificate Authority (CA) 110, which is used to sign certificates installed on the host, the storage device and the external key manager server and to establish trust between them.

Host 102 includes, for instance, an external key manager (EKM) client 120 coupled to an internal key store 122 for storing keys. Client 120 includes the protocol used, in one example, to communicate with key server 106. Internal key store 122 is further coupled to Fibre Channel (FC) ports (e.g., FICON channels) 128 used to communicate with storage device 104, and to Ethernet ports 124, at least one of which is coupled to a port 126 of external key manager server 106 via a connection 108. (FICON is a known communication path for data between the host and the storage device utilizing Fibre Channel technology, and Ethernet is a known local area network.)

Similarly, in one example, storage device 104 includes an external key manager client 130, which is used to communicate with key server 106 and is coupled to an internal key store 132 for storing keys. Internal key store 132 is further coupled to Fibre Channel ports 136 used to communicate with host 102, and to Ethernet ports 134, at least one of which is coupled to port 126 of external key manager server 106 via a connection 108. Example storage devices include control units (CU), storage controllers, etc.

External key manager server 106 is used, as described below, to provide shared keys, also referred to as wrapping keys, to the host and storage device. It is trusted by the host and the storage device via, for instance, certificates installed on the host, storage device and key manager server at set-up, and signed by Certificate Authority 110.

Although examples of protocols, communication paths and technologies are provided herein, one or more aspects are applicable to other types of protocols, communication paths and/or technologies. Further, other types of nodes may employ one or more aspects of the present invention. Additionally, a node may include fewer, more, and/or different components. As an example, it may not include the internal key store. Moreover, two nodes coupled to one another may be both the same type of node or different types of nodes. As examples, both nodes are hosts, both nodes are storage devices, or one node is a host and another node is a storage device, as described in the examples herein. Many variations are possible.

As an example, a host may be a computing device, such as a processor, a computer system, a central electronics complex (CEC), etc. One example of a computer system that may include and/or use one or more aspects of the present invention is depicted in FIG. 2A.

Figure 2A:
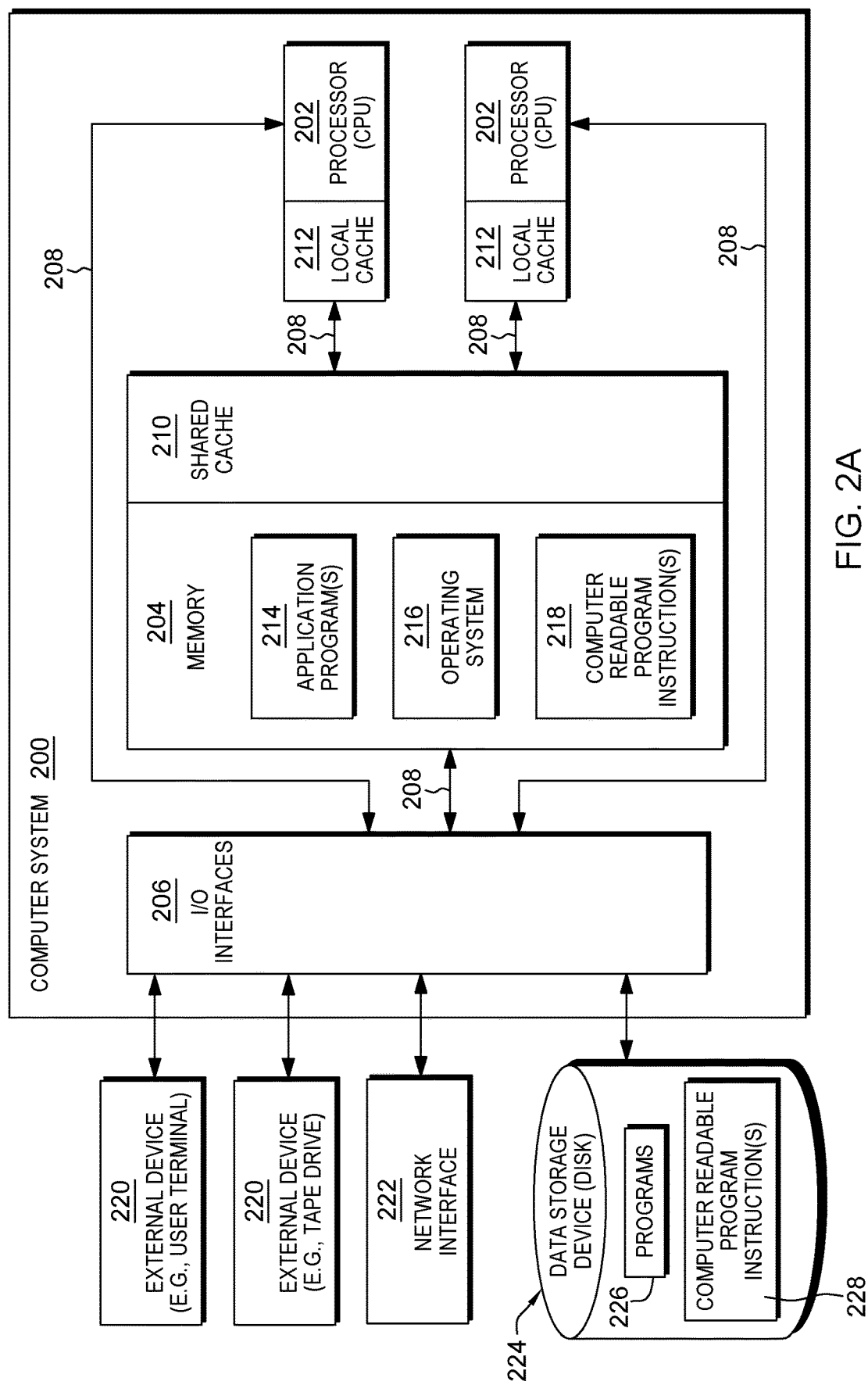
FIG. 2A depicts one example of a host of the computing environment of FIG. 1 to incorporate and/or use one or more aspects of the present invention.

Referring to FIG. 2A, in one example, a computer system 200 is shown in the form of a general-purpose computing device. Computer system 200 includes and/or is coupled to a plurality of components, which are in addition to and/or include the components shown in FIG. 1 including, but not limited to, EKM client 120, internal key store 122, Ethernet ports 124 and Fibre Channel ports 128, which are part of and/or coupled to the computer system, but not explicitly indicated in FIG. 2A. In one example, computer system 200 includes, but is not limited to, one or more processors or processing units 202 (e.g., central processing units (CPUs)), a memory 204 (a.k.a., system memory, main memory, main storage, central storage or storage, as examples), and one or more input/output (I/O) interfaces 206, coupled to one another via one or more buses and/or other connections 208.

Continuing with FIG. 2A, bus 208 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 204 may include, for instance, a cache, such as a shared cache 210, which may be coupled to local caches 212 of processors 202. Further, memory 204 may include one or more programs or applications 214, an operating system 216, and one or more computer readable program instructions 218. Computer readable program instructions 218 may be configured to carry out functions of embodiments of aspects of the invention.

Computer system 200 may also communicate via, e.g., I/O interfaces 206 with one or more external devices 220, one or more network interfaces 222, and/or one or more data storage devices 224. Example external devices include a user terminal, a tape drive, a pointing device, a display, etc. Network interface 222 enables computer system 200 to communicate with one or more networks, such as a local area network (LAN), a general wide area network (WAN), and/or a public network (e.g., the Internet), providing communication with other computing devices or systems.

Data storage device 224 may store one or more programs 226, one or more computer readable program instructions 228, and/or data, etc. The computer readable program instructions may be configured to carry out functions of embodiments of aspects of the invention.

Computer system 200 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 200. Examples, include, but are not limited to: microcode, device drivers, redundant processing units, external disk drive arrays, RAID systems, tape drives, and data archival storage systems, etc.

Computer system 200 may be operational with numerous other general purpose or special purpose computing system environments or configurations. Examples of well-known computing systems, environments, and/or configurations that may be suitable for use with computer system 200 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As indicated above, a computer system is one example of a host that may incorporate and/or use one or more aspects of the present invention. Another example of a host to incorporate and/or employ one or more aspects of the present invention is a central electronics complex, an example of which is depicted in FIG. 2B.

Figure 2B:
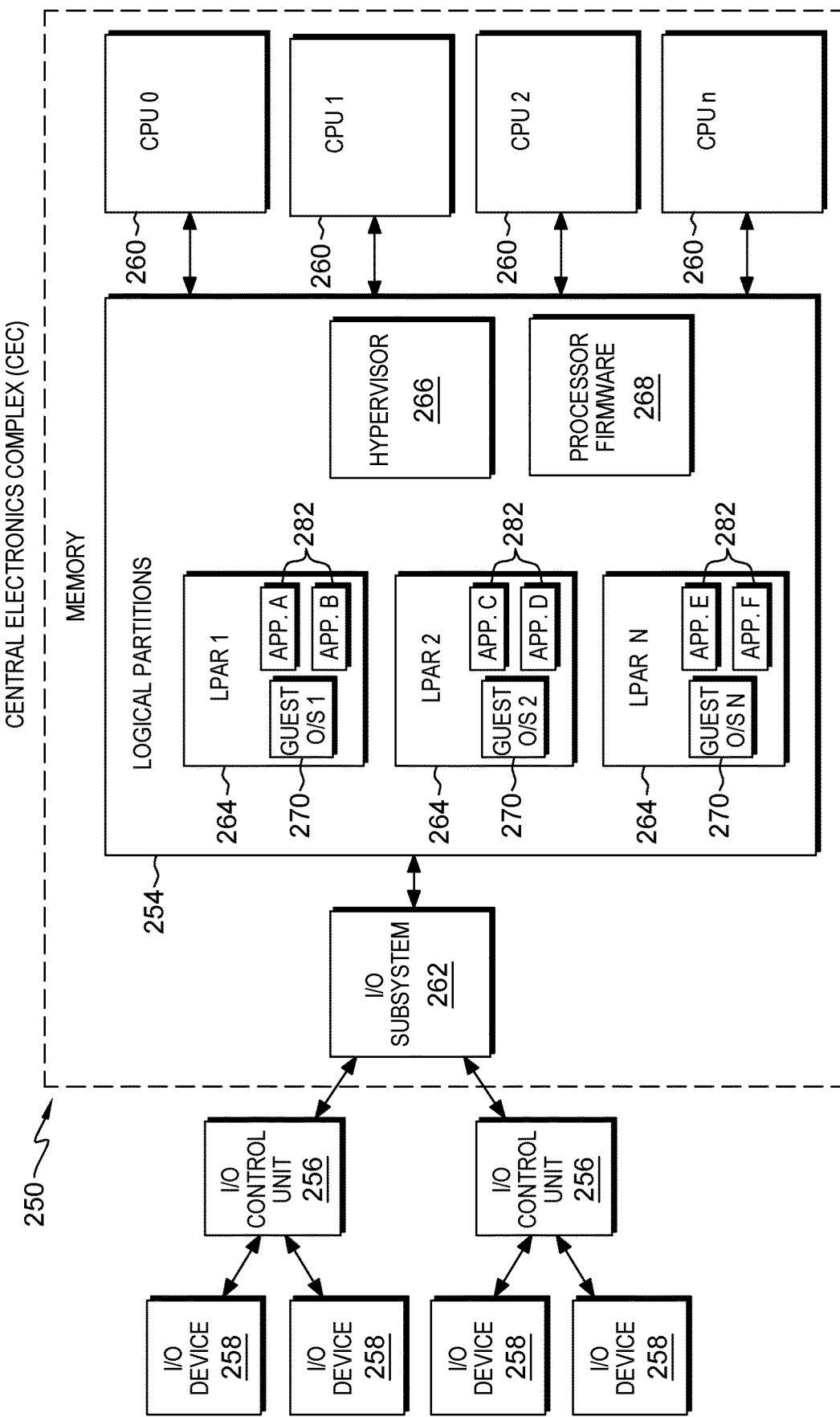
FIG. 2B depicts another example of a host of the computing environment of FIG. 1 to incorporate and/or use one or more aspects of the present invention.

Referring to FIG. 2B, in one example, a central electronics complex (CEC) 250 includes and/or is coupled to a plurality of components, which are in addition to and/or include the components shown in FIG. 1 including, but not limited to, EKM client 120, internal key store 122, Ethernet ports 124 and Fibre Channel ports 128, which are part of and/or coupled to the central electronics complex, but not explicitly indicated in FIG. 2B. In one example, CEC 250 includes, but is not limited to, a memory 254 (a.k.a., system memory, main memory, main storage, central storage, storage) coupled to one or more processors (a.k.a., central processing units (CPUs)) 260, and to an input/output subsystem 262.

In one example, memory 254 of central electronics complex 250 includes, for example, one or more logical partitions 264, a hypervisor 266 that manages the logical partitions, and processor firmware 268. One example of hypervisor 266 is the Processor Resource/System Manager (PRISM), offered by International Business Machines Corporation, Armonk, N.Y. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 264 is capable of functioning as a separate system. That is, each logical partition can be independently reset, run a guest operating system 270 such as z/OS, offered by International Business Machines Corporation, or another operating system, and operate with different programs 282. An operating system or application program running in a logical partition appears to have access to a full and complete system, but in reality, only a portion of it is available.

Memory 254 is coupled to processors (e.g., CPUs) 260, which are physical processor resources that may be allocated to the logical partitions. For instance, a logical partition 264 includes one or more logical processors, each of which represents all or a share of a physical processor resource 260 that may be dynamically allocated to the logical partition.

Further, memory 254 is coupled to I/O subsystem 262. I/O subsystem 262 may be a part of the central electronics complex or separate therefrom. It directs the flow of information between main storage 254 and input/output control units 256 and input/output (I/O) devices 258 coupled to the central electronics complex.

While various examples of hosts are described herein, other examples are also possible. Further, a host may also be referred to herein as a source, a server, a node, or an endpoint node, as examples. Additionally, a storage device may be referred to herein as a target, a node, or an endpoint node, as examples. Example storage devices include storage controllers or control units. Other examples are also possible.

Figure 3A:
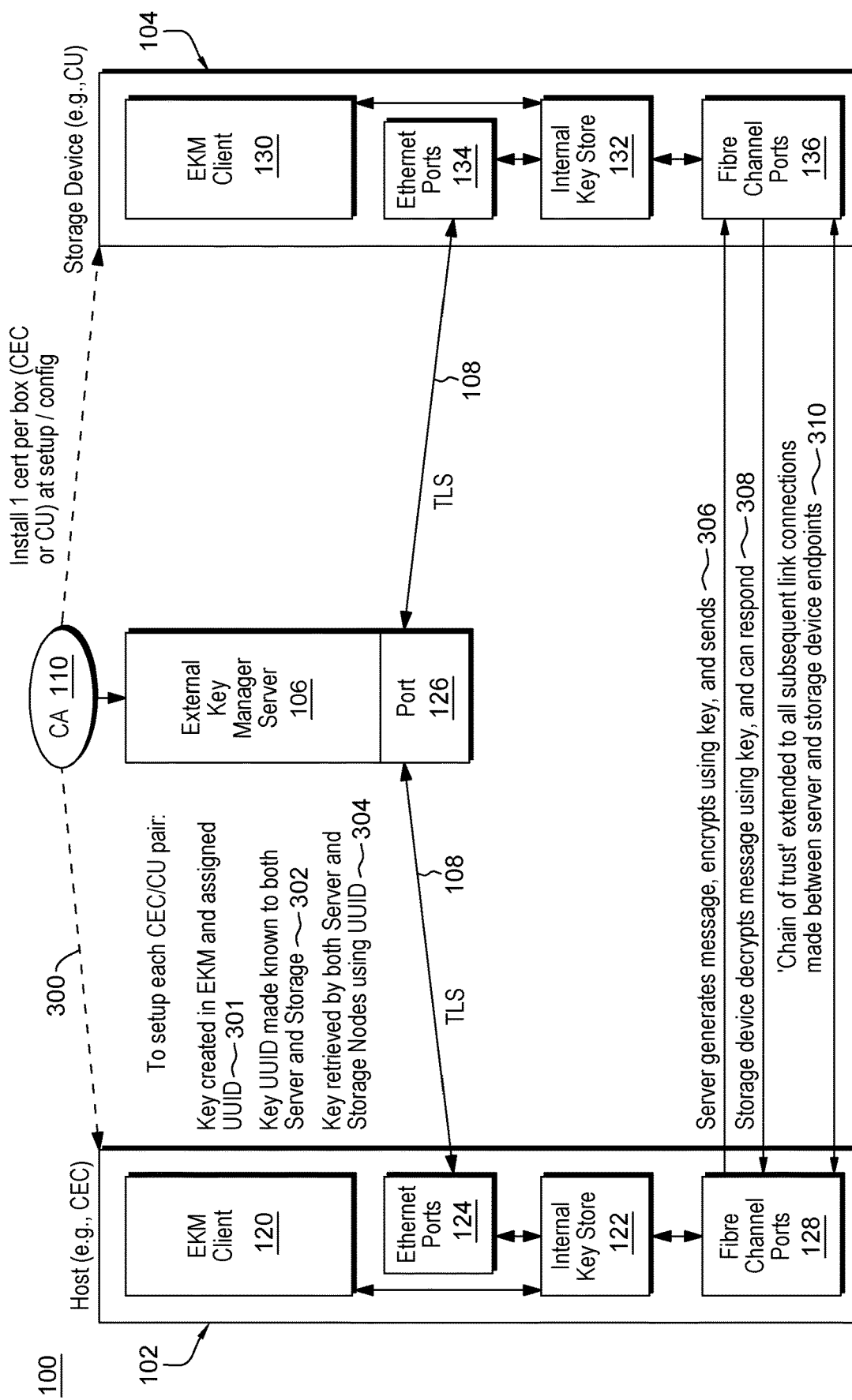
FIG. 3A depicts one example of securing a network using key server authentication, in accordance with one or more aspects of the present invention.

In one example, two nodes, such as a host (e.g., host 102) and a storage device (e.g., storage device 104), participate in an authentication protocol to provide a trust with one another. These nodes are referred to herein as peer nodes. The nodes communicate with one another via a plurality of links, and this trust extends to the links between the nodes facilitating authentication of the links, as described below. One example of this protocol is described with reference to FIGS. 3A-3B.

In accordance with an aspect of the present invention, the authentication protocol includes the use of certificates, as well as a shared key (e.g., a wrapping key), as described herein. Initially, signed certificates, signed by a Certificate Authority (e.g., Certificate Authority 110), are installed in each host and storage device (e.g., each endpoint node), as well as in external key manager server 106, STEP 300. Each node uses the certificate in an initial authentication to authenticate itself with the external key manager server. One embodiment of this initial authentication is further described with reference to FIG. 3B.

Figure 3B:
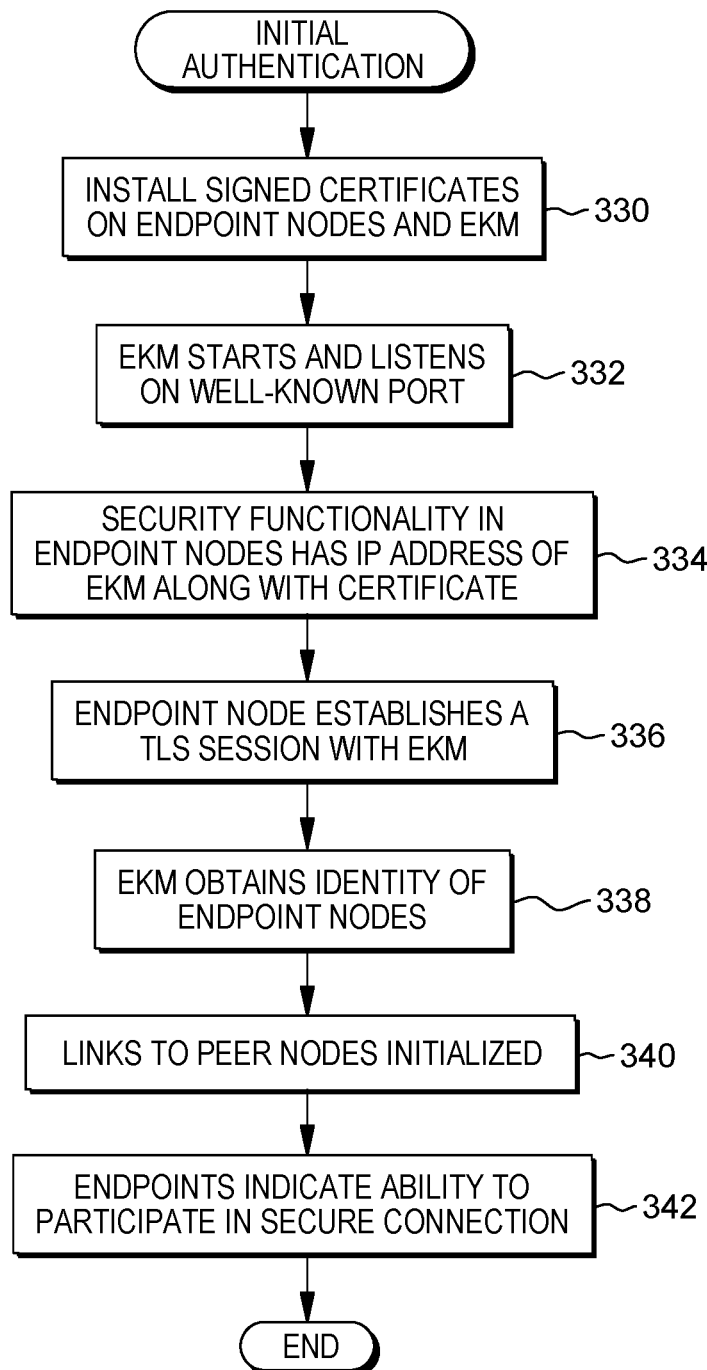
FIG. 3B depicts details of one embodiment of an initial authentication, in accordance with one or more aspects of the present invention.

Referring to FIG. 3B, signed certificates, signed by a Certificate Authority, are installed in each of the endpoint nodes (e.g., host 102 and storage device 104) and the key server (e.g., EKM 106), along with a certificate of the Certificate Authority, STEP 330. Each node uses the certificate signed by the Certificate Authority to authenticate itself with the external key manager, which also includes the certificates. The external key manager starts and listens on a well-known port (e.g., port 126), STEP 332. The security functionality in the endpoint nodes has the Internet Protocol (IP) address of the EKM along with its pre-installed certificate, STEP 334. The endpoint node establishes a secure session (e.g., a TLS session) with the EKM using both client and server authentication protocols, STEP 336. Further, the EKM obtains the identity of the endpoint nodes, STEP 338. For instance, a descriptive and recognizable name of the endpoint node is included in the certificate as the identity of the endpoint node. The identifier could have been pre-registered into the databases of the EKM, or it can be dynamically registered and authorized through successful establishment of the TLS session along with additional optional white-list security administrator action (e.g., explicit action by a user). The protocol used to exchange commands and data with the EKM is, for instance, KMIP (Key Management Interoperability Protocol) or any other proprietary interface protocol packaged for use within the secure TLS session. TLS and KMIP are just examples. Other protocols and secure communications may be used.

Based on a node establishing a secure connection to the EKM, links to the peer nodes can be initialized, STEP 340. As part of link initialization, via, for instance, a Fibre Channel Port Login (PLOGI) command, both endpoints indicate their ability to participate in a secure connection (e.g., Secure Fibre Channel Connection), in one example, STEP 342.

Returning to FIG. 3A, subsequent to the initial authentication with the key server using certificates, further authentication is performed using a shared key (e.g., a wrapping key). A wrapping key is, for instance, an AES 256 algorithm key generated by, for instance, the key server. (In other embodiments, it is generated by another entity and stored at the key server or in storage accessible to the key server. Other possibilities also exist.) It is used in the encryption/decryption of messages transmitted between the nodes. In one example, there is a single wrapping key per node pair (e.g., per physical host/storage device pair), regardless of the logical pairings or paths between them.

In accordance with an aspect of the present invention, a wrapping key is created in the EKM and assigned a universal unique identifier (UUID), STEP 301. The UUID is, for instance, a KMIP (or other protocol) attribute assigned to an encryption key (e.g., the wrapping key) during creation. The key is created for use by the node pair by any selected technique, which may be programmatic or administrative. In the examples described below, the node pair includes a host, which may be referred to as a server, and a storage device, such as a control unit. However, as indicated, this is only one example, and many variations exist.

The key UUID is made known to both the host and the storage device, STEP 302. In one example, it is obtained without direct communication between the node pair; however, in another example, there is communication between the node pair in which the UUID is communicated from, e.g., the host to the storage device. As specific examples, the UUID is requested by the host and the storage device from the key server; it is programmed at the host and the storage device; it is obtained by the host and storage device from a component other than the key server; it is requested by one node, such as the host, from the key server, and sent from the one node to the other node, such as the storage device, as described further below; etc. In this embodiment, the UUID may be obtained in any manner. Based on obtaining the UUID, the host and the storage device request the wrapping key having that UUID from the external key manager (e.g., via the secure connection), STEP 304. The external key manager provides the wrapping key directly to each node, based on the request and the UUID.

In one embodiment, the UUID and the wrapping key are obtained by the host and the storage device absent communication with one another. Instead, both the UUID and the wrapping key associated with the UUID are independently obtained by each node (e.g., the host and storage device). For instance, they may be obtained directly from the EKM or another entity. As another example, the UUID is known to both nodes, and the wrapping key is obtained directly from the EKM. Other examples are also possible.

In other embodiments, the wrapping key is obtained by the host and storage device directly from the EKM without communication with one another, but the obtaining of the UUID by at least one of the nodes employs communication between the nodes. Many variations are possible.

The obtaining of the wrapping key by both the peer nodes authenticates the peer nodes with the key server. However, in one embodiment, further authentication is performed to authenticate the links coupling the peer nodes. While this further authentication is performed on each desired link, no further authentication is performed with the key server. A single authentication with the key server applies to all (or selected) links coupling the peer nodes.

In one embodiment, link authentication includes the host generating a message, encrypting that message using at least the wrapping key, and sending the encrypted message to the storage device on one of the links coupling the host and the storage device, STEP 306. For instance, the message is encrypted by the host using an agreed upon encryption technique, such as AES_KEYWRAP, and sent to the peer endpoint as the payload of a new message code of the Fibre Channel Extended Link Service, known in the FC-LS-3 standard as AUTH_ELS. The storage device receives the AUTH_ELS and decrypts the payload utilizing the obtained wrapping key and the deployed AES_KEYWRAP technique, STEP 308. In one embodiment, the storage device may also respond to the message. In one example, the sending of the encrypted message using the wrapping key and the successful decryption of that message using the wrapping key authenticates the link on which the message is sent/received. In a further example, it is the sending of the message, encrypted using the shared key, from the host to the storage device; successful decryption of that message using the shared key by the storage device; encryption of a response using the shared key; sending of the encrypted response by the storage device to the host; and successful decryption of the encrypted response by the host that completes authentication of two links between the trusted nodes.

In one example, the link authentication is repeated on all (or selected) links (e.g., Fibre Channel links) between the same host and storage device utilizing the same unique shared key defined for this pairing, STEP 310. This authenticates each link between the peer nodes without re-obtaining the wrapping key from the key server. The wrapping key is obtained over, e.g., the TLS connection only once per peer node, but used multiple times to authenticate each desired link between the peer nodes. Therefore, the chain of trust between the nodes is extended to facilitate authentication between all (or a selected subset of) subsequent link connections made between the host and the storage device endpoints.

In one particular example, the encrypted message sent on a link contains the name identifier of the originator, and successful decryption of the message along with validation that the included name identifier matches that of the originator at login completes the authentication at the storage device. This authentication authenticates the peer nodes and the link on which the message is sent/received.

Further, in one particular example in which the host supplies the UUID to the storage device, the host generated message may be, for instance, the message that provides the UUID of the wrapping key to the storage device. The storage device then uses the UUID to obtain the wrapping key directly from the key server, and uses the wrapping key to decrypt the payload. The payload may include various information, including, but not limited to, send and receive keys to be used in other communications between the nodes.

Described in detail herein is one example of providing authentication of a plurality of N Ports or links in a communication fabric (e.g., Fibre Channel fabric) through mutual authentication of two nodes (e.g., Fibre Channel nodes) common to a key manager. In one example, the peer nodes (e.g., the host and the storage device) each authenticate to an external key manager, which includes configuring the IP address of the EKM in the nodes. A shared wrapping key is created by the EKM (or otherwise obtained by the EKM) and the identifier of that key is obtained by the host and the storage device. Further, the host and the storage device obtain the wrapping key directly from the EKM as trusted entities of the EKM. The host uses the key to encrypt messages sent to the storage device using an encryption technique (e.g., ABS_KEYWRAP), and the storage device successfully decrypts the messages to authenticate the storage device (e.g., Fibre Channel node) as a trusted entity using the same encryption technique. The authentication (chain of trust) is extended to all (or a selected subset) of secured logins (N_Port to N_Port links) between the host and the storage device to facilitate authentication of all (or selected) links between the trusted nodes.

In one embodiment, the shared wrapping key is generated by the EKM upon request by the requesting node regardless of whether the target node exists. There is no need for advance association or large look-up tables for matching up the nodes that can communicate with one another. The key server generates the shared keys, in one embodiment, without knowledge of characteristic information of the nodes; it does not even need to know whether the target node exists. Authentication of the host and the storage device to the EKM, rather than to each other, is enough for the EKM to share the shared key with the host and the storage device.

In one aspect, generating and obtaining of the wrapping keys is automated, such that administrative management of the keys is not needed. In this embodiment, an initiator-responder relationship is established between the nodes, in which, in one example, the host takes on the role of the initiator and the storage device takes on the role of the responder. Other variations are possible.

In one aspect of automating the generating/obtaining of the wrapping key, the initiator node (e.g., host 102) requests creation of the wrapping key by the key server, obtains the UUID and the wrapping key, and passes the UUID to the responder node (e.g., storage device 104). In a further aspect of the automating the obtaining, the responder node obtains the UUID from the initiator node and using the UUID, requests the wrapping key directly from the key server. The same wrapping key is used to encrypt/decrypt communications on the links between the initiator node and the responder node. These communications may be used to exchange further key information (e.g., send/receive keys) used to protect I/O operation data. Further details regarding these aspects of generating/obtaining the wrapping key are described with reference to FIG. 4.

Figure 4:
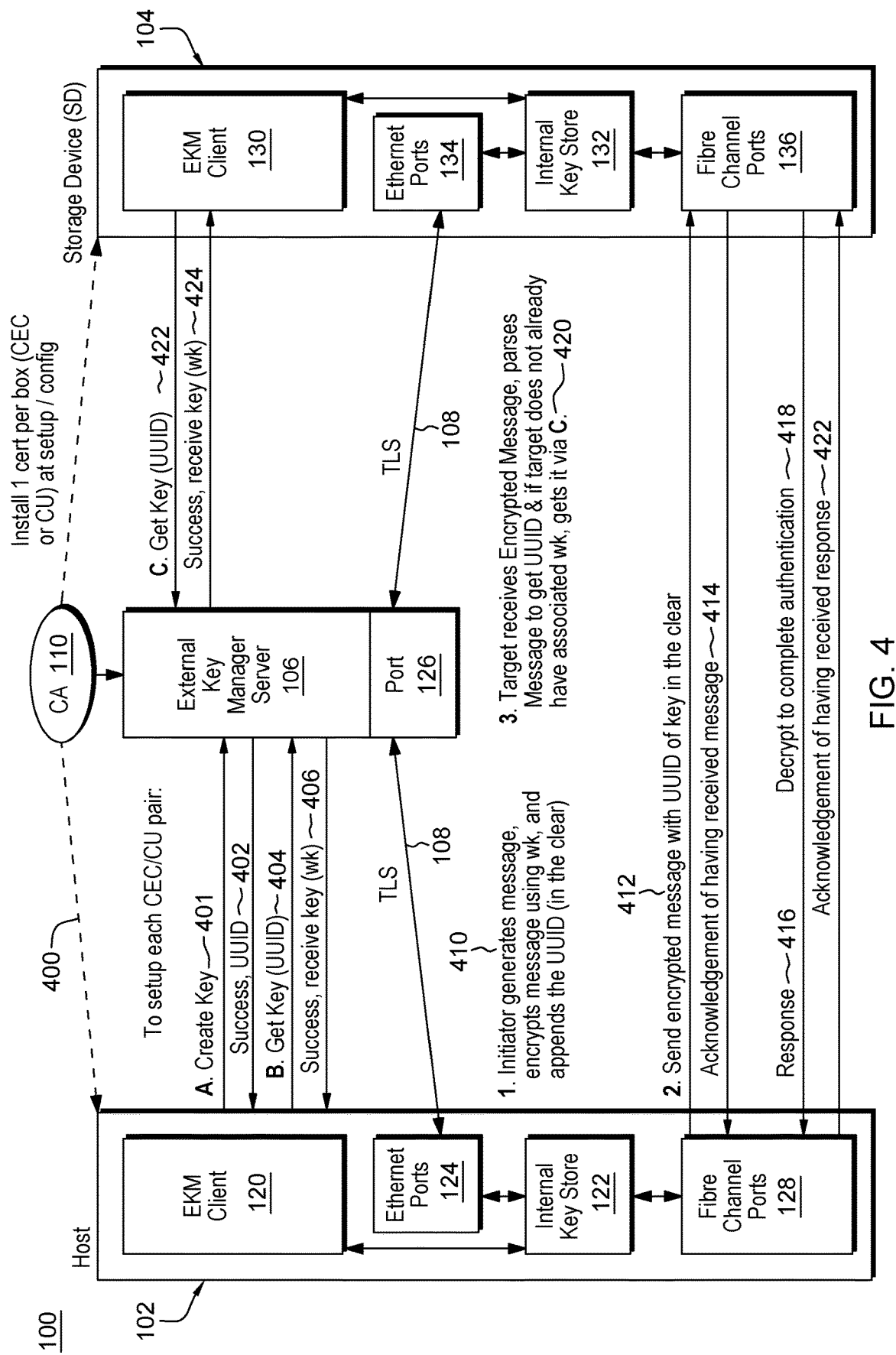
FIG. 4 depicts one example of automating shared secret generation to secure links on a host and/or a storage device, in accordance with one or more aspects of the present invention.

Referring to FIG. 4, in one example, initial authentication takes place, in which the initiator node (e.g., host 102) and the responder node (e.g., storage device 104) authenticate themselves using, e.g., certificates with the key manager server (e.g., key server 106), STEP 400. One example of this initial authentication is described with reference to FIG. 3B. Further, in one embodiment, prior to authentication of a first security capable link between the host and the storage device, the host initiates the creation of a unique shared key (e.g., wrapping key) to be used by the host/storage device pair. For instance, the host sends a Create Key Request to the external key manager server using, e.g., secure connection 108, STEP 401. Based on the create request, external key manager server 106 creates a wrapping key (wk) and responds with a universally unique identifier (UUID) for the wrapping key, STEP 402. Based on receiving the UUID, the host follows-up with a request for the wrapping key by sending, for instance, a Get Key request using the UUID obtained from external key manager server 106, STEP 404. The external key manager server responds with a wrapping key, STEP 406.

In one example, based on receiving the wrapping key, the host generates a message, encrypts the message using the wrapping key, and appends the UUID in the clear, STEP 410. In one example, the message includes other key information, such as send/receive keys to be used in encryption/decryption of messages transmitted between the host and the particular storage device. For instance, a host reads from and writes data to a storage device through a communication channel, such as a Fibre Channel, Infiniband, or a TCP/IP network. The data communicated between the host and the storage device is encrypted using a set of encryption keys, called send and receive keys. A send or transmit key is, for instance, an AES (Advanced Encryption Standard) 256 algorithm key stored, e.g., in a register of communication adapters between a host and a storage device, and used to encrypt and decrypt customer data flowing between the storage device and the host. A receive key is, for instance, an AES 256 algorithm key stored in, e.g., a register of communication adapters between a host and a storage device, and used to encrypt and decrypt data flowing between the storage device and the host. However, other examples are possible, in which the message includes other data or information.

The host sends to the storage device over a link (e.g., a Fibre Channel link) an authorization message (e.g., an Auth_ELS FC command) that includes, for instance, the UUID of the wrapping key in the clear, an agreed upon encryption technique (e.g., AES Keywrap) and the encrypted message, STEP 412. The host receives over the link an acknowledgement to the authorization message (e.g., a LS_ACC ELS response) from the storage device, STEP 414. Further, in one embodiment, the host receives a response message from the storage device, which includes content encrypted with the wrapping key, STEP 416. The host decrypts the content using the same wrapping key to complete the authentication process through validation of the received message, STEP 418. Further, in one embodiment, the host acknowledges receipt of the response, STEP 422.

In one embodiment, the host sends an authorization message that includes, for instance, the UUID of the wrapping key generated for this host-storage device pair in the clear, an agreed upon encryption technique (e.g., AES Keywrap), and an encrypted message to each secure link to be established between the host-storage device pair. This facilitates authentication on each selected link without requiring additional requests of the wrapping key from the key server, and without further authentication of the host and storage device with the key server (e.g., only one authentication per node with the key server is performed).

Thus, in accordance with one or more aspects of the present invention, the initiator node (e.g., host 102) initiates creation of the wrapping key at the key server, obtains the wrapping key from the key server, and passes an UUID of the wrapping key to the responder node (e.g., storage device 104) to enable the responder node to retrieve the same wrapping key from the key server.

Processing associated with the role of the responder node (e.g., storage device 104) in the wrapping key generation, distribution and processing is now described with reference to FIG. 4. Based on the storage device receiving the authentication message, which includes the UUID, the agreed upon encryption technique, and the encrypted message, over a link coupling the storage device and the host, in one embodiment, the storage device acknowledges to the host successful receipt of the authentication message, STEP 414. This acknowledgement is performed, in one embodiment, for each authentication message received over each link that is to be authenticated.

Further, in one embodiment, based on the storage device receiving a first authentication message from the host on a link coupling the host and the storage device, the storage device parses the message to obtain the UUID, and then obtains the wrapping key associated with the UUID, STEP 420. In one embodiment, the storage device attempts to retrieve the wrapping key from its local key store (e.g., internal key store 132), STEP 420, but if the wrapping key is, e.g., a new key, and therefore, not in the internal store yet, the storage device requests the wrapping key from the external key manager server 106, STEP 422. External key server 106 responds with the wrapping key, STEP 424, and the storage device decrypts the encrypted message using the wrapping key and the agreed upon encryption technique to complete, in one embodiment, the authentication process. In a further embodiment, the storage device sends an encrypted response to the host indicating successful decryption of the message, STEP 416, which the host decrypts to complete authorization, STEP 418.

The obtaining of the wrapping key by the storage device is performed, in one example, on the first receipt of the encrypted message with the UUID. It is not performed for authentication of the other links coupling the host and the storage device. Instead, for the other links, the same wrapping key, previously obtained by the storage device from the key server (or otherwise), is used to decrypt the message and send an encrypted response to the host. The wrapping key obtained from the host and the storage device may be used to encrypt/decrypt communications on all (or a selected subset) of the links between the host and the storage device.

As described above, in one embodiment, the initiator (e.g., host 102) obtains the wrapping key and passes the UUID of the wrapping key to the storage device (e.g., storage device 104) via a link established between the host and the storage device. The storage device uses the UUID passed to it in a message over the link (e.g., the first link to receive the message) to obtain the wrapping key from, for instance, the external key manager. The wrapping key is then used to encrypt/decrypt communications on all (or selected) links between the host and the storage device.

In one aspect, the external key server dynamically generates the secret shared wrapping key upon request of the initiator node, and shares that wrapping key, e.g., only with the properly designated communication partner. The created wrapping key is specifically for the initiator/responder node pair, such that only the authorized pair of nodes has access to the wrapping key (besides the external key manager). The target node uses the wrapping key to unwrap (i.e., decrypt) other information, such as send/receive keys. Thus, the send/receive keys are not known to the external key manager, which enhances security of the send/receive keys and the system.

In a further aspect, authentication includes the use of an alternate name for one or more of the nodes. This alternate name is, for instance, a World-Wide Node Name (WWNN) associated with an endpoint node. In one embodiment, certificates provide multiple fields that can be set at the discretion of the certificate creator, including an alternate name field. The Fibre Channel FC-FS-4 standard, as an example, provides a mechanism by which each Fibre Channel node is assigned a World-Wide Node Name, which is designed to be unique within a Fibre Channel name space. The WWNN associated with an endpoint node can also be obtained by an entity connected to the endpoint node through utilizing Extended Link Service commands provided by the FC-LS-3 standard. One embodiment described below employs the WWNN of the host or the storage device specified in the alternate name field of the signed certificate. This enables finer granularity of access control, since the nodes permitted to communicate with one another may be controlled using the alternate names. For instance, an indication is maintained of which storage controllers the host may communicate with, etc. Further, in accordance with an aspect of the present invention, access of the shared key is further controlled by the initiator node indicating which responder node is to share the wrapping key with the initiator node.

As an example, when the host connects to a storage device, it queries the WWNN of the attached storage device. When it makes a request to the external key manager to create a shared key (e.g., a symmetric wrapping key), it includes the WWNN of the storage device peer to which it wants the shared key to be accessible (in addition to itself as creator). Thus, in this embodiment, the external key manager only serves the shared key to the creator and to the entity whose certificate contained the WWNN in the alternate name field. One example of this embodiment is further described below with reference to FIG. 5A.

Figure 5A:
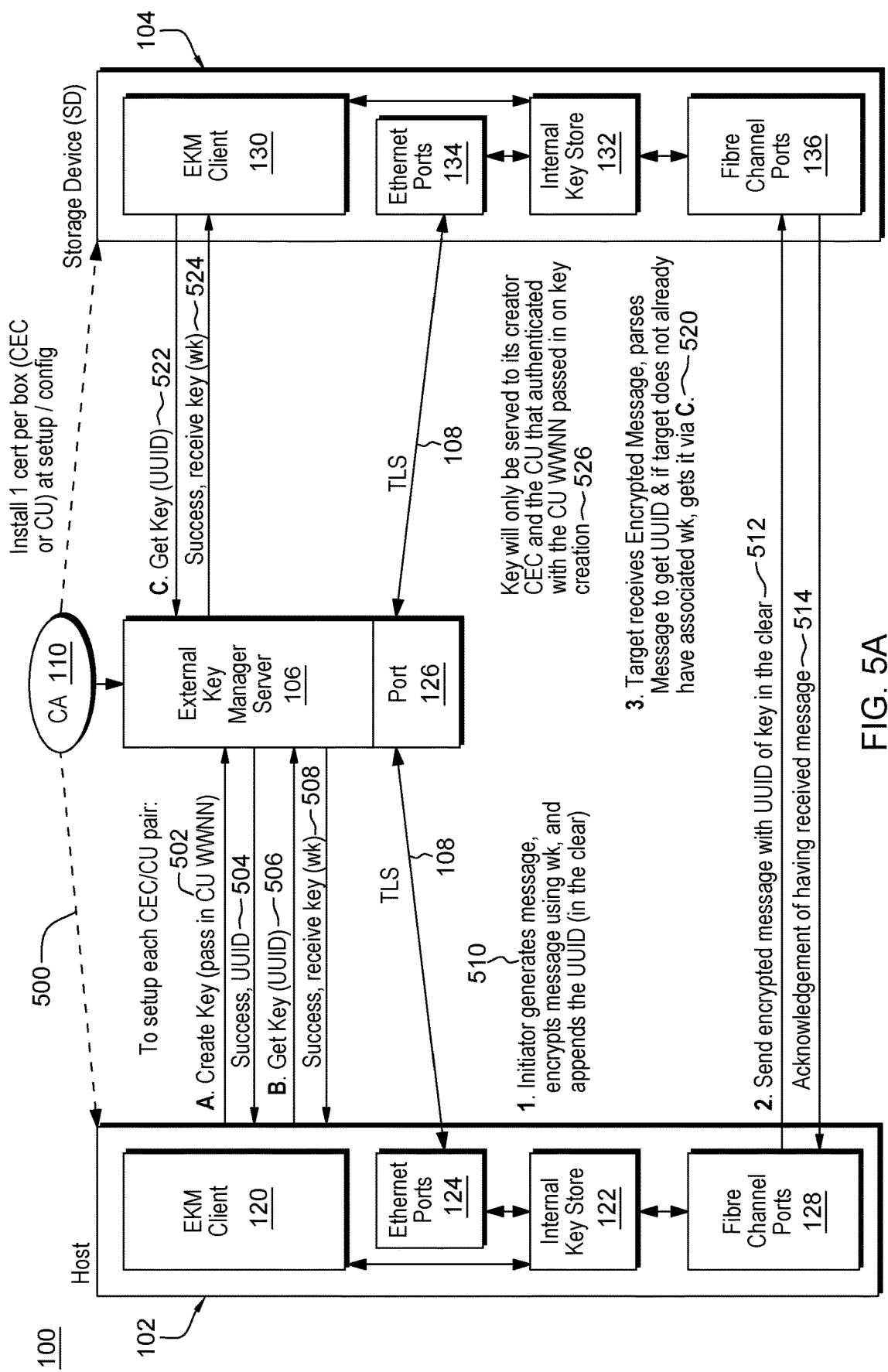
FIG. 5A depicts one example of providing access control for connectivity relationships using a key server, in accordance with an aspect of the present invention.

Referring to FIG. 5A, in one example, one node (e.g., host 102) and another node (e.g., storage device 104) participate in an authentication protocol to provide trust with one another. Initially, signed certificates, signed by a Certificate Authority (e.g., Certificate Authority 110), are installed in each endpoint node (e.g., host and storage device), as well as in in the external key manager server, STEP 500. Each node uses the certificate to authenticate itself with the external key manager server. One embodiment of this initial authentication is further described with reference to FIG. 5B.

Figure 5B:
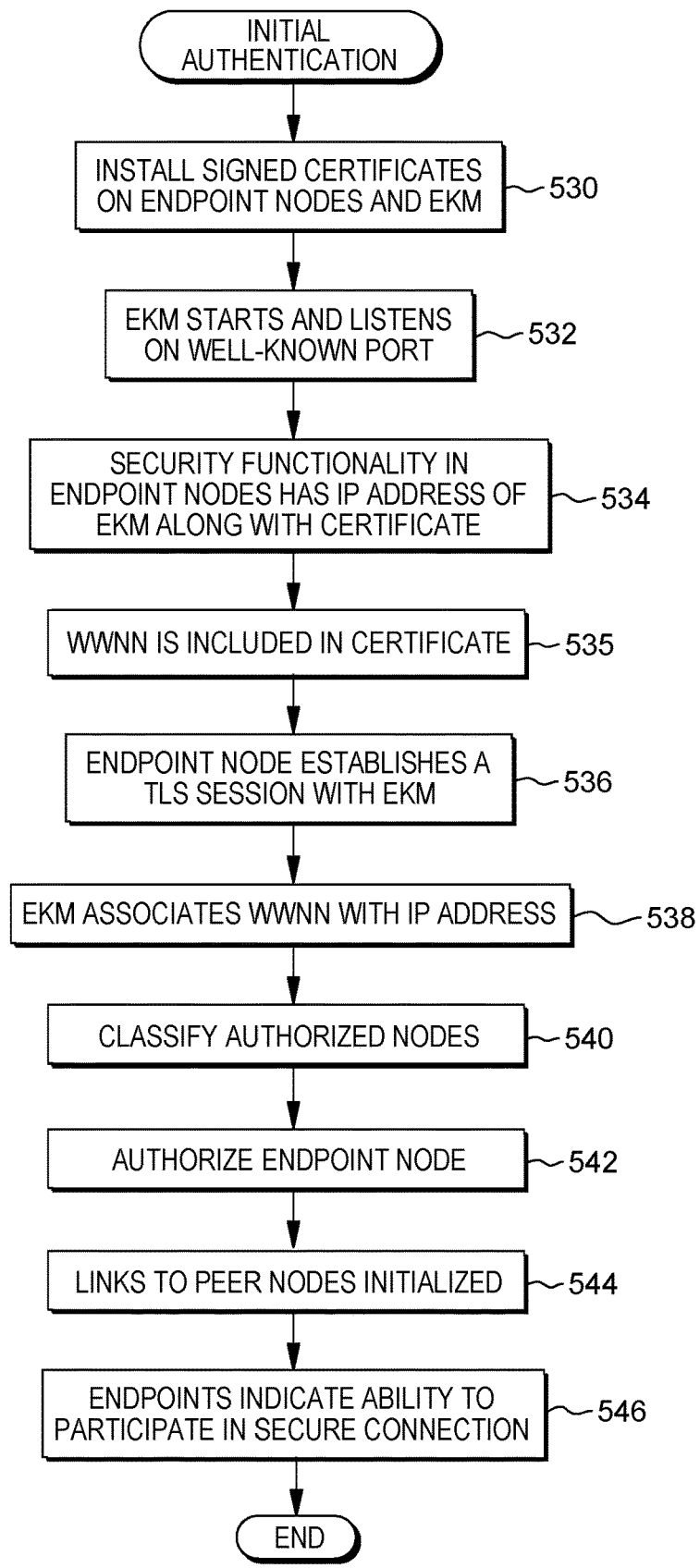
FIG. 5B depicts details of another embodiment of an initial authentication, in accordance with one or more aspects of the present invention.

Referring to FIG. 5B, signed certificates, signed by a Certificate Authority, are installed in each of the endpoint nodes (e.g., host and storage device) and the key server, along with a certificate of the Certificate Authority, STEP 530. Each node uses the certificate to authenticate itself with the external key manager, which also includes the certificates. The external key manager starts and listens on a well-known port (e.g., port 126), STEP 532. The security functionality in the endpoint nodes has the Internet Protocol (IP) address of the EKM along with its pre-installed certificate, STEP 534. A descriptive and recognizable name of the endpoint node (e.g., the Fibre Channel World-Wide Node Name) is included in the 'Subject Alternative Name' field of the certificate as the identity of the endpoint node, STEP 535. The endpoint node establishes a secure session (e.g., a TLS session) with the EKM using both client and server authentication protocols, STEP 536. The EKM associates the WWNN with the IP address and other information by which the authenticated entity is known to it, STEP 538.

Further, in one embodiment, the Security Administrator (or other entity) for the computing environment may classify the full set of authorized endpoint nodes into groups, limiting access between sets of endpoints in the larger pool of authorized entities, STEP 540. For instance, it is the responsibility of the Security Administrator to install certificates with appropriate roots of trust on nodes. A group of available and allowed peers may be set by the Security Administrator through the combination of which nodes valid certificates are installed, along with the establishment of some form of group definition at the key server. The key server may require or allow, in one embodiment, the Security Administrator to additionally explicitly permit or authorize an endpoint node into the pool or a specific grouping after it has successfully completed the TLS authentication process, STEP 542. The protocol used to exchange subsequent commands and data with the EKM can be KMIP or any other proprietary interface protocol packaged for use within the secure TLS session. In other embodiments, other protocols and/or secure communications may be used.

Based on a node establishing a secure connection to the EKM, links to the peer nodes can be initialized, STEP 544. The list of authorized connections may be provided by an authorized system I/O administrator through a configuration file. In IBM Z, this configuration file is known as an I/O configuration Data Set (IOCDS), but could also be specified via other means such as through a graphical user interface (GUI) on the EKM or at one or more endpoint nodes, as examples. Additionally (or instead of the I/O configuration file), a SAN (Storage Area Network) administrator establishes fabric zoning policies limiting access of endpoints to each other through the fabric, and those policies are input to the SAN for enforcement. Many possibilities exist.

As part of link initialization, via, for instance, a Fibre Channel Port Login (PLOGI) command, both endpoints indicate their ability to participate in a secure connection (e.g., Fibre Channel connection), in one example, STEP 546. Further, in one embodiment, as part of or prior to link initialization, by a pre-established convention or set of rules, one endpoint node assumes the role of an initiator in an initiator/responder relationship for the connection. If both endpoints have indicated an ability to establish a secure link, on a select (e.g., first) communication between the two nodes, the initiator endpoint node (e.g., the host) requests that a shared secret (e.g., wrapping key) be created for use in further communication with the peer endpoint node (e.g., storage device), as described herein. The peer is identified using the same descriptive, recognizable and unique name (WWNN) that was contained in the peer certificate utilized during the TLS session establishment. The EKM enforces that this key can be retrieved, e.g., only by the endpoint node that created it and the particular peer endpoint node for which it was created. The distribution of the wrapping key can occur via a pull mode where each endpoint node requests a key based on the identifier value, a push model where the EKM sends the created key to the two parties that are in the membership domain for this key, or a combination of both in which one entity pulls the wrapping key information, and the other entity is pushed the wrapping key information. Other variations also exist. Further details regarding the distribution of the shared key are described with reference to FIG. 5A.

Referring to FIG. 5A, in accordance with an aspect of the present invention, the initiator node (e.g., host 102) initiates the creation of a wrapping key by an external key server (e.g., external key manager server 106) by, for instance, sending a Create Key Request to the external key manager server using secure connection 108, STEP 502. In accordance with this aspect of the present invention, the WWNN of the responder node (e.g., the control unit (CU) WWNN) is passed to the EKM as part of the request. Based on the create request, external key manager server 106 creates a wrapping key (wk) and responds with a universally unique identifier (UUID) for the wrapping key, STEP 504. Based on receiving the UUID, the host follows-up with a request for the wrapping key by sending, for instance, a Get Key request using the UUID obtained from external key manager server 106, STEP 506. The external key manager server responds with a wrapping key, STEP 508.

Based on receiving the wrapping key, the host generates a message, and encrypts the message using the wrapping key, STEP 510. In one example, the message includes other key information, such as send/receive keys to be used in encryption/decryption of messages transmitted between the host and the particular storage device. The host sends an authorization message (e.g., an Auth_ELS FC command) to the storage device over a link that includes, for instance, the UUID of the wrapping key in the clear, an agreed upon encryption technique, and the encrypted message, STEP 512. In one example, the storage device responds with an acknowledgement (e.g., a LS_ACC ELS response) to the authorization message, STEP 514.

Further, in accordance with an aspect of the present invention, based on receiving the UUID and the encrypted message, the storage device parses the message to obtain the UUID, and uses the UUID to obtains the wrapping key associated with the UUID, STEP 520. In one embodiment, the storage device attempts to retrieve the wrapping key from its local key store (e.g., internal key store 132), STEP 520, but if the wrapping key is not in the internal store, the storage device requests the wrapping key from, e.g., external key manager server 106, STEP 522. In one embodiment, external key manager server 106 determines whether the storage device is in the same authorized pool as the host and/or whether the storage device was identified as the peer for this host (e.g., in the certificate shared with the key server), STEP 526. If the key server determines that the storage device is authorized to receive the shared key, the key server responds with the wrapping key, STEP 524. If, however, the storage device is not in the same pool or is not identified as the peer, it will not be successful in retrieving the key from the key server and no further communication between the endpoint nodes will be performed until, for instance, a relevant security policy changes. Although various security policies are described herein, others may be used without departing from a spirit of aspects of the present invention.

In one embodiment, assuming the storage device is successful in obtaining the shared key, to complete authentication on this link, the storage device encrypts a response message using the shared key and sends the encrypted response message to the host, which decrypts it. Successful decryption of the response, in one embodiment, indicates successful authentication.

If the storage device is successful in obtaining the wrapping key, then the wrapping key is used, for instance, to encrypt/decrypt communications on all (or a selected subset) of the links between the host and the storage device. The wrapping key is used in authenticating other links coupling the host and the storage device without requiring the further obtaining of the wrapping key from the key server. Authentication with the key server is performed, e.g., once, and then the obtained wrapping key is used in link authentication for a plurality of links between the peer nodes.

Described above is one embodiment of a key server providing peer to peer access control between two nodes (e.g., Fibre Channel nodes). In one example, each node in, for instance, a Fibre Channel SAN identifies an alternate name in a certificate used for key server authentication. For instance, the Fibre Channel WWNN is placed in an alternate name field of the certificate. A host provides the alternate name of a peer to the EKM during a create key request. In one example, an IOCDS is used by the host to determine peers to which secure access is allowed. The key server uses the alternate name to serve the key to select entities (e.g., the requestor of the key and the named peer).

The above described methodology is used to provide access control in, for instance, secure Fibre Channel relationships between two nodes connected via links (e.g., physical connections, such as Fibre Channel links), in which the two nodes are a host and a storage device, two hosts, or two storage devices, etc. The node that assumes the initiator role is determined, for example, through administrative configuration or via an automated convention. Many variations are possible.

Figure 6A:
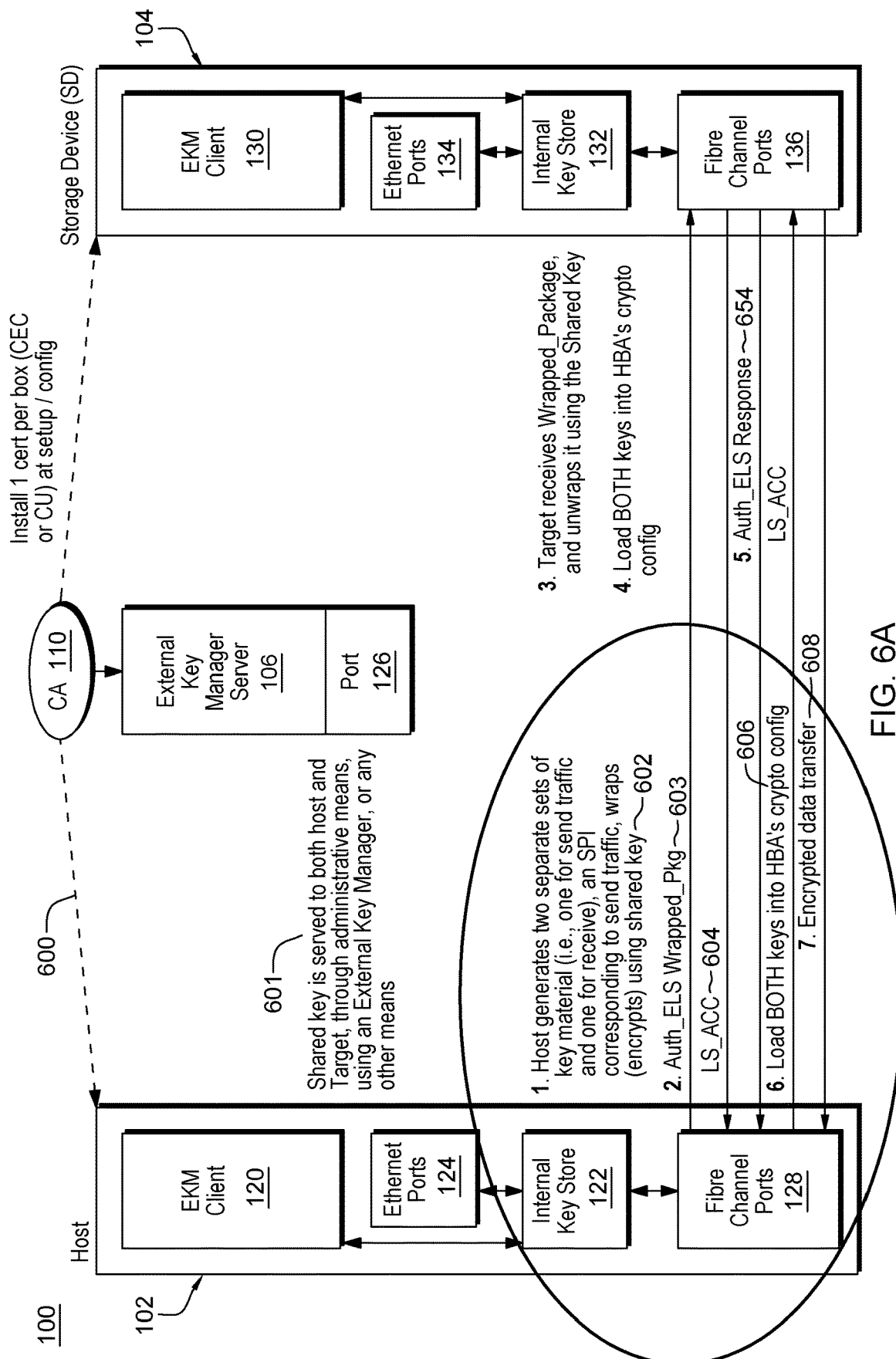
FIGS. 6A-6B depict one example of securing a path at a host using secure key exchange, in accordance with one or more aspects of the present invention.
Figure 6B:
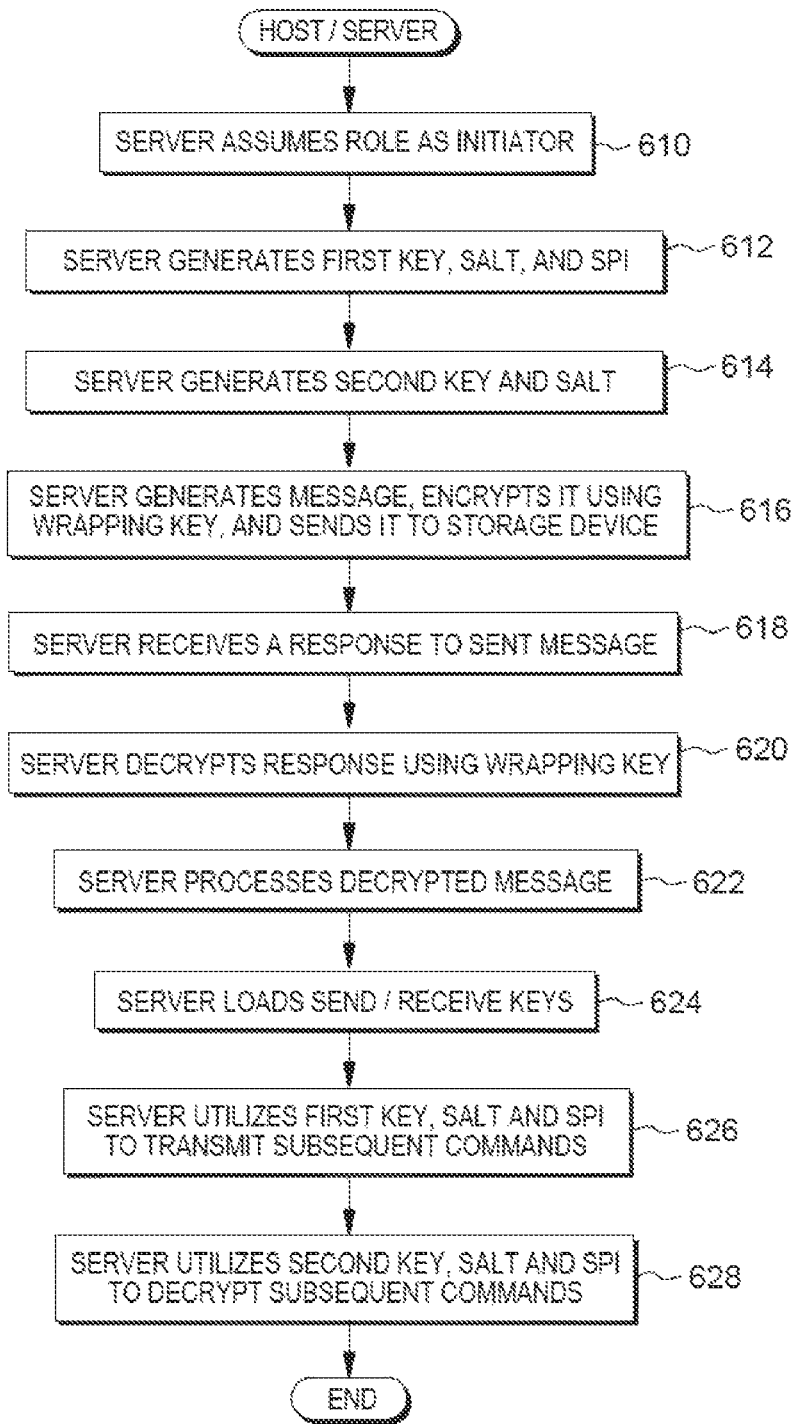

A further embodiment relating to peer nodes (e.g., a host and a storage device) securing a Fibre Channel path at their end using the secure key exchange is described with reference to FIGS. 6A-6D. FIGS. 6A-6B highlight example tasks performed by the initiator node (e.g., host or server), and FIGS. 6C-6D highlight example tasks performed by the responder node (e.g., storage device, such as a storage controller).

Referring to FIGS. 6A-6B, as described above, initially, signed certificates are installed in each endpoint node (e.g., each host and storage device) and the key server, along with the certificate of the Certificate Authority, STEP 600. As described above (e.g., FIG. 3B and/or FIG. 5B), each node uses the certificate to authenticate itself with an external key manager server (e.g., EKM 106). The EKM starts and listens on a well-known port. The security functionality in the endpoint nodes has the IP address of the EKM along with its pre-installed certificate. The endpoint node establishes a secure session (e.g., a TLS session) with the EKM using both client and server authentication flows. A descriptive and recognizable name of the endpoint node is included in the certificate as the identity of the endpoint node. This identifier could have been pre-registered into the database of the EKM or it can be dynamically registered and authorized through successful establishment of the TLS session along with additional optional white-list security administrator action upon establishment of the TLS session. The protocol used to exchange commands and data with the EKM is, for instance, KMIP or any other proprietary interface protocol packaged for use within the secure TLS session.

In one aspect, based on a node establishing a secure connection to the EKM over one link, other links to the peer nodes can be initialized. As part of link initialization (e.g., processing the Fibre Channel Port Login (PLOGI) command), both endpoints indicate, for instance, their ability to participate in a secure connection by, for instance, setting a security capable indicator (e.g., a bit). Other mechanisms are also possible.

Continuing with FIG. 6A, in one embodiment, a wrapping key is created for use by peer nodes (e.g., a host and storage device pairing) by either a programmatic or administrative mechanism, using an external key manager, and this shared wrapping key is assigned a UUID, STEP 601. If both endpoint nodes have indicated an ability to establish a secure link, as trusted entities of the EKM, each endpoint node obtains the wrapping key. For instance, each node retrieves the wrapping key from the EKM, based on a first communication between the nodes. In other embodiments, each node obtains the wrapping key in another manner, such as from an internal key store. Other variations are also possible.

Based on obtaining the wrapping key, the wrapping key is used in further communication between the peer nodes on one or more links coupling the nodes. This is described in further detail with reference to FIGS. 6A-6B. In one embodiment, the host (e.g., server) assumes the role of initiator in an initiator/responder slave relationship, STEP 610. The server generates or otherwise obtains a first set of key material, such as a first encryption key (e.g., a send or transmit key) and one or more first encryption parameters, such as, e.g., a salt (e.g., random data used in encryption) and a Security Parameters Index (SPI) (e.g., an identification tag), to be used for the transmission of I/O command data from the initiator node (e.g., server) to the responder node (e.g., storage device) on the link (and used by the storage device on reception of I/O command data from the server), STEPS 602, 612. Further, the server generates or otherwise obtains a second set of key material, such as a second encryption key (e.g., a receive key) and one or more second encryption parameters, such as a salt, to be used for the transmission of I/O command data from the storage device to the server on the link (and used by the server on reception of this data from the storage device), STEPS 602, 614.

The server generates a message, encrypts the message using at least the wrapping key, and sends the encrypted message to the storage device, STEPS 603, 616. For instance, the message is encrypted by the server using an AES_KEYWRAP technique (or other suitable technique)

and sent to the storage device as the payload of a new Secure Key Exchange message code of the Fibre Channel Extended Link Service, known in the FC-LS-3 standard as AUTH_ELS. The only part of the payload that is sent in the clear is, for instance, the identifier (UUID) of the wrapping key that was created and stored within, e.g., the EKM. The payload includes, for instance, the first and second keys, the two salts, the SPI, and the encryption technique to be used, which are encrypted with the wrapping key, and the UUID in the clear.

Subsequently, the server receives an acknowledgment message (e.g., LS_ACC) from the storage controller acknowledging receipt of the message, STEP 604. Additionally, in one embodiment, the server receives an encrypted response message from the storage controller, which is encrypted with the wrapping key, STEP 618, 654. The server decrypts the encrypted response message using the wrapping key retrieved from the EKM and deploying the AES_KEY-WRAP or other suitable technique, STEP 620. The server processes the decrypted message, which includes an SPI associated with the second encryption key and salt, STEP 622.

In one example, the server loads the send and receive keys into the host bus adapter's (HBA's) cryptographic configuration or other suitable location, STEPS 606, 624. The server utilizes, in one example, the first encryption key (e.g., send key), salt and SPI to securely transmit subsequent command data to the storage controller, STEP 626. The server utilizes the second encryption key (e.g., receive key), salt and SPI to decrypt subsequent command data received from the storage controller endpoint, STEPS 608, 628. This enables secure communication between the peer nodes, which is facilitated by the use of the wrapping key obtained from the external key server.

Figure 6C:
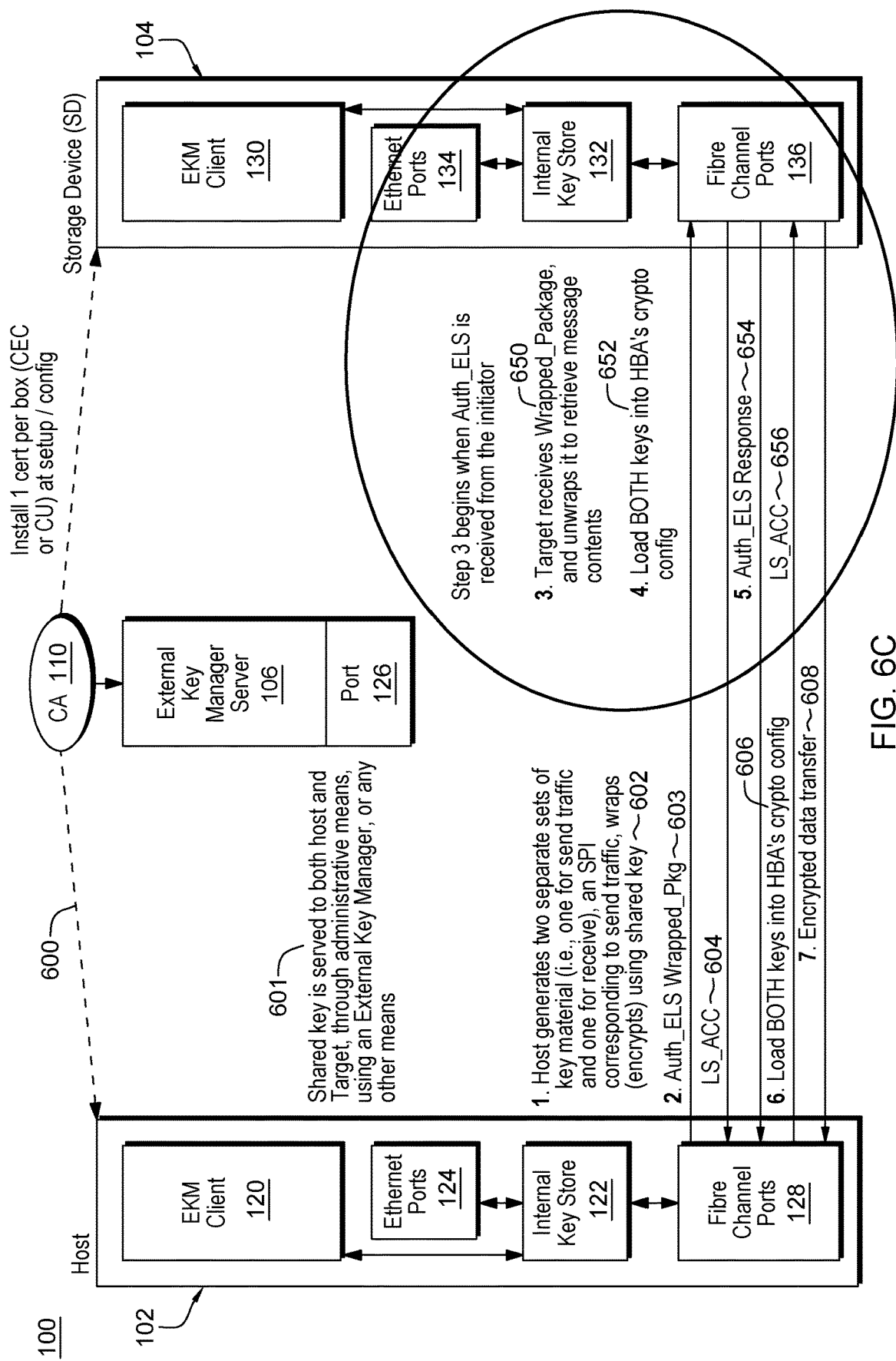
FIGS. 6C-6D depict one example of securing a path at a storage device using secure key exchange, in accordance with one or more aspects of the present invention.
Figure 6D:
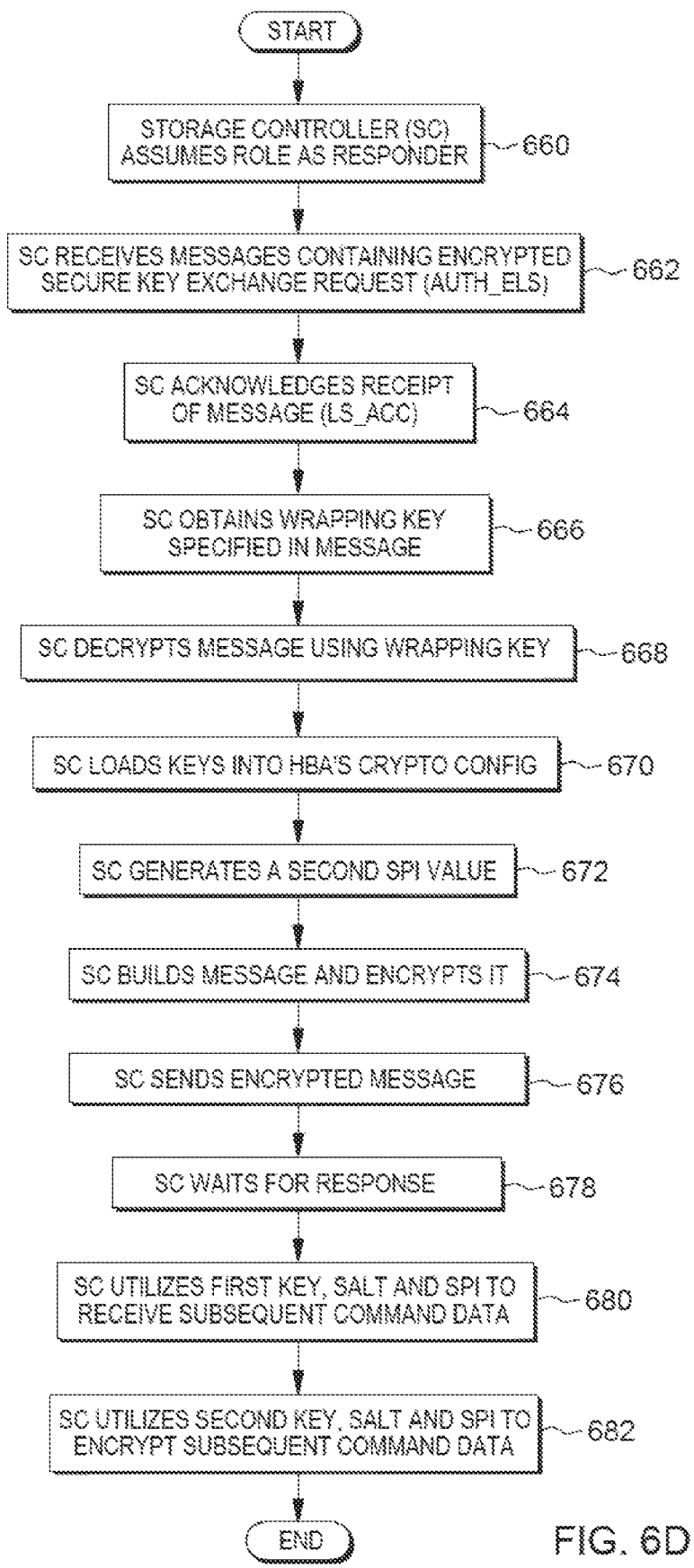

As indicated above, the server sends an Auth_ELS with a wrapped package to the storage device, such as a storage controller, and the storage controller processes the message, as described with reference to FIGS. 6C-6D. In this example, the storage controller assumes the role of responder in the initiator/responder relationship, STEP 660. The storage controller receives a message containing an encrypted secure key exchange request (e.g., Auth_ELS), and unwraps the message, STEPS 650, 662. The message includes, for instance, the encrypted payload and the UUID of the wrapping key, in the clear. The storage controller acknowledges successful receipt of the message to the originating server, STEPS 604, 664. If not already in possession of the wrapping key identified in the message payload by the UUID, the storage controller retrieves the wrapping key from, e.g., the EKM, STEP 666. The storage controller utilizes the shared wrapping key and the agreed upon encryption technique to decrypt the message payload, which includes a first encryption key (e.g., send key), an associated salt and SPI, and a second encryption key (e.g., receive key) and associated salt, STEP 668. The storage controller loads the send/receive keys from the decrypted message into, for instance, the HBA's cryptographic configuration or another defined location, STEPS 652, 670. The storage controller generates a second SPI value to be associated with the second encryption key and salt, STEP 672. The storage controller builds a response message that includes the second SPI in the payload, and encrypts this message using the wrapping key and the designated encryption technique (e.g., AES_KEYWRAP), STEP 674.

The storage controller sends the encrypted message to the server endpoint node, STEPS 654, 676, and the storage controller endpoint node waits to receive a response acknowledging successful receipt of the encrypted message it sent, STEPS 656, 678.

The storage controller utilizes the first encryption key, salt and SPI to securely receive subsequent command data sent from the server, STEP 680. Further, the storage controller utilizes the second encryption key, SALT and SPI to encrypt subsequent command data sent to the server, STEP 682.

As described above, an initiator/responder relationship is established between two nodes (e.g., a host and a storage device), with one node (e.g., the host) assuming the role of initiator. The initiator creates or otherwise obtains unique key material (e.g., send/receive keys), and other associated parameters (e.g., salts, SPI) for use on each link between the nodes for both sending and receiving data in subsequent I/O operations between the two nodes on the link (although one parameter, e.g., an SPI, is created by the responder node (e.g., storage device) and sent to the initiator). The key material and parameters are exchanged in messages protected by a shared wrapping key served previously to the peer nodes by the external key manager. Based on the message passing being completed in both directions, the endpoints utilize the new key material to securely transmit and receive I/O command data. In one embodiment, the responder node receives an identifier of the shared wrapping key that is used to decrypt a message containing send/receive keys. If the responder can successfully decrypt the message, the initiator is authenticated. A single message is used with less cryptographic operations, in one embodiment.

Although various embodiments are described herein, other variations and embodiments are possible.

One or more aspects of the present invention are inextricably tied to computer technology and facilitate processing within a computer, improving performance thereof. In one example, performance enhancement is provided in authenticating links between nodes. These links are used to securely transmit messages between the nodes coupled by the links. One or more aspects reduce link initialization time, increase productivity within the computer environment, enhance security within the computer environment, and/or increase system performance.

One particular example of facilitating processing within a computing environment, as it relates to link authentication, is described with reference to FIGS. 7A-7B. Referring to FIG. 7A, in one aspect, a path for one node (e.g., a responder node) of the computing environment is secured (700). The securing the path includes, for instance, obtaining, by the one node, a message, the message including an identifier of a shared key and an encrypted message, the encrypted message including a first encryption key, a second encryption key, one or more first parameters and one or more second parameters (702). Further, the one node obtains the shared key from a key server coupled to the one node, the one node having a secure connection with the key server (704). The shared key is used to decrypt the encrypted message to obtain the first encryption key, the second encryption key, the one or more first parameters and the one or more second parameters (706). Moreover, in one example, a second security parameters index, to be associated with the second encryption key and the one or more second parameters, is obtained (708). The one node sends a response message to another node (e.g., a initiator node), the response message including the second security parameters index, wherein a secure path over a link coupling the one node and the other node is provided (710).

In one embodiment, the securing the path further includes establishing by the one node the secure connection with the key server, the establishing the secure connection using one or more certificates of authentication (712). At least one certificate of authentication includes, for instance, a name associated with the one node to enable the key server to trust the one node (714).

As examples, referring to FIG. 7B, the one or more first parameters include a first salt and a first security parameters index (720), and the one or more second parameters include a second salt (722).

Further, in one embodiment, the securing the path includes using the second encryption key and the second salt to transmit subsequent data (724). The securing the path further includes, in one or more embodiments, encrypting the response message using the shared key (726), and receiving a reply to the response message (728). The securing the path further includes, in one embodiment, using the first encryption key and the one or more first parameters to decrypt received data (730).

As an example, the using the shared key includes using the shared key in a cryptographic technique to decrypt the encrypted message (732).

Many variations are possible.

Figure 8A:
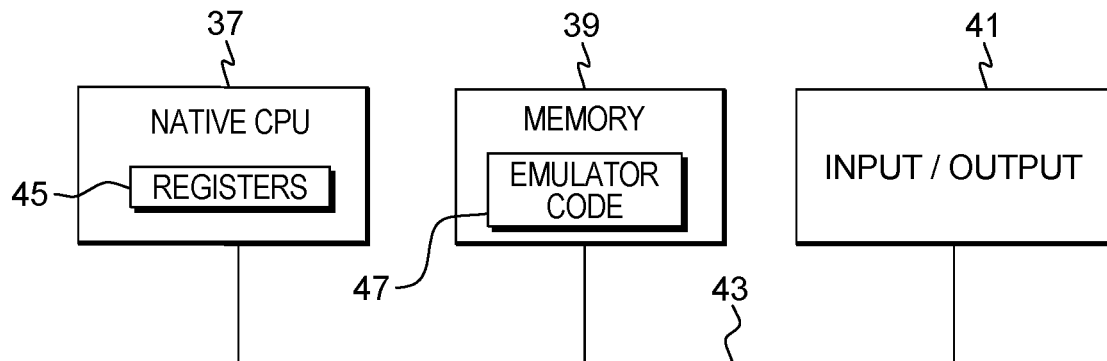
FIG. 8A depicts another example of a computing environment to incorporate and use one or more aspects of the present invention.

Further other types of computing environments may also incorporate and use one or more aspects of the present invention, including, but not limited to, emulation environments, an example of which is described with reference to FIG. 8A. In this example, a computing environment 35 includes, for instance, a native central processing unit (CPU) 37, a memory 39, and one or more input/output devices and/or interfaces 41 coupled to one another via, for example, one or more buses 43 and/or other connections. As examples, computing environment 35 may include a PowerPC processor offered by International Business Machines Corporation, Armonk, N.Y.; and/or other machines based on architectures offered by International Business Machines Corporation, Intel, or other companies.

Native central processing unit 37 includes one or more native registers 45, such as one or more general purpose registers and/or one or more special purpose registers used during processing within the environment. These registers include information that represents the state of the environment at any particular point in time.

Moreover, native central processing unit 37 executes instructions and code that are stored in memory 39. In one particular example, the central processing unit executes emulator code 47 stored in memory 39. This code enables the computing environment configured in one architecture to emulate another architecture. For instance, emulator code 47 allows machines based on architectures other than the z/Architecture, such as PowerPC processors, or other servers or processors, to emulate the z/Architecture and to execute software and instructions developed based on the z/Architecture.

Figure 8B:
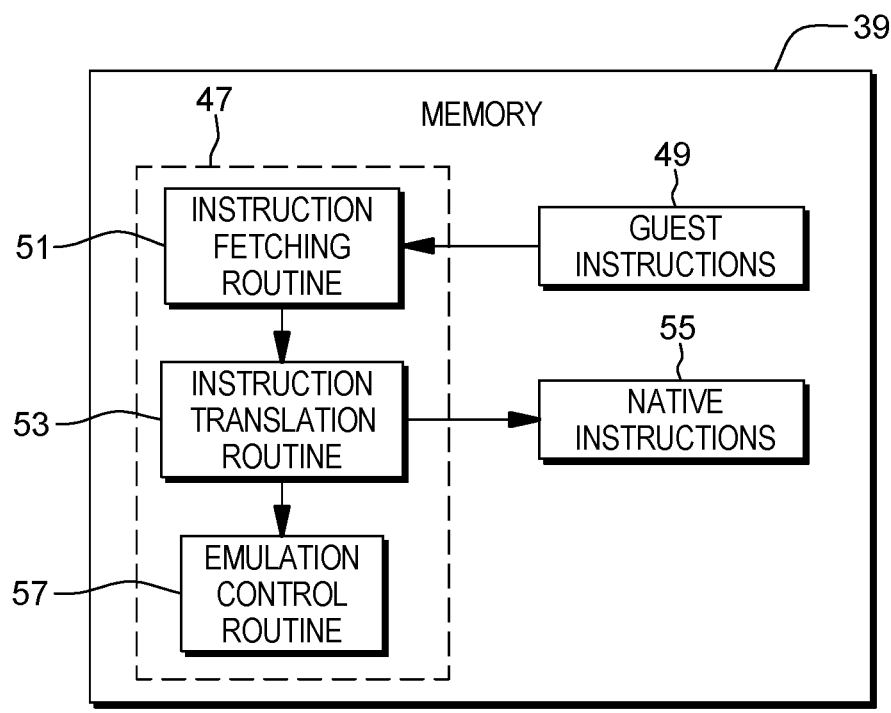
FIG. 8B depicts further details of the memory of FIG. 8A.

Further details relating to emulator code 47 are described with reference to FIG. 8B. Guest instructions 49 stored in memory 39 comprise software instructions (e.g., correlating to machine instructions) that were developed to be executed in an architecture other than that of native CPU 37. For example, guest instructions 49 may have been designed to execute on a z/Architecture processor, but instead, are being emulated on native CPU 37, which may be, for example, an Intel processor. In one example, emulator code 47 includes an instruction fetching routine 51 to obtain one or more guest instructions 49 from memory 39, and to optionally provide local buffering for the instructions obtained. It also includes an instruction translation routine 53 to determine the type of guest instruction that has been obtained and to translate the guest instruction into one or more corresponding native instructions 55. This translation includes, for instance, identifying the function to be performed by the guest instruction and choosing the native instruction(s) to perform that function.

Further, emulator code 47 includes an emulation control routine 57 to cause the native instructions to be executed. Emulation control routine 57 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 55 may include loading data into a register from memory 39; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 45 of the native CPU or by using locations in memory 39. In embodiments, guest instructions 49, native instructions 55 and emulator code 37 may reside in the same memory or may be disbursed among different memory devices.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
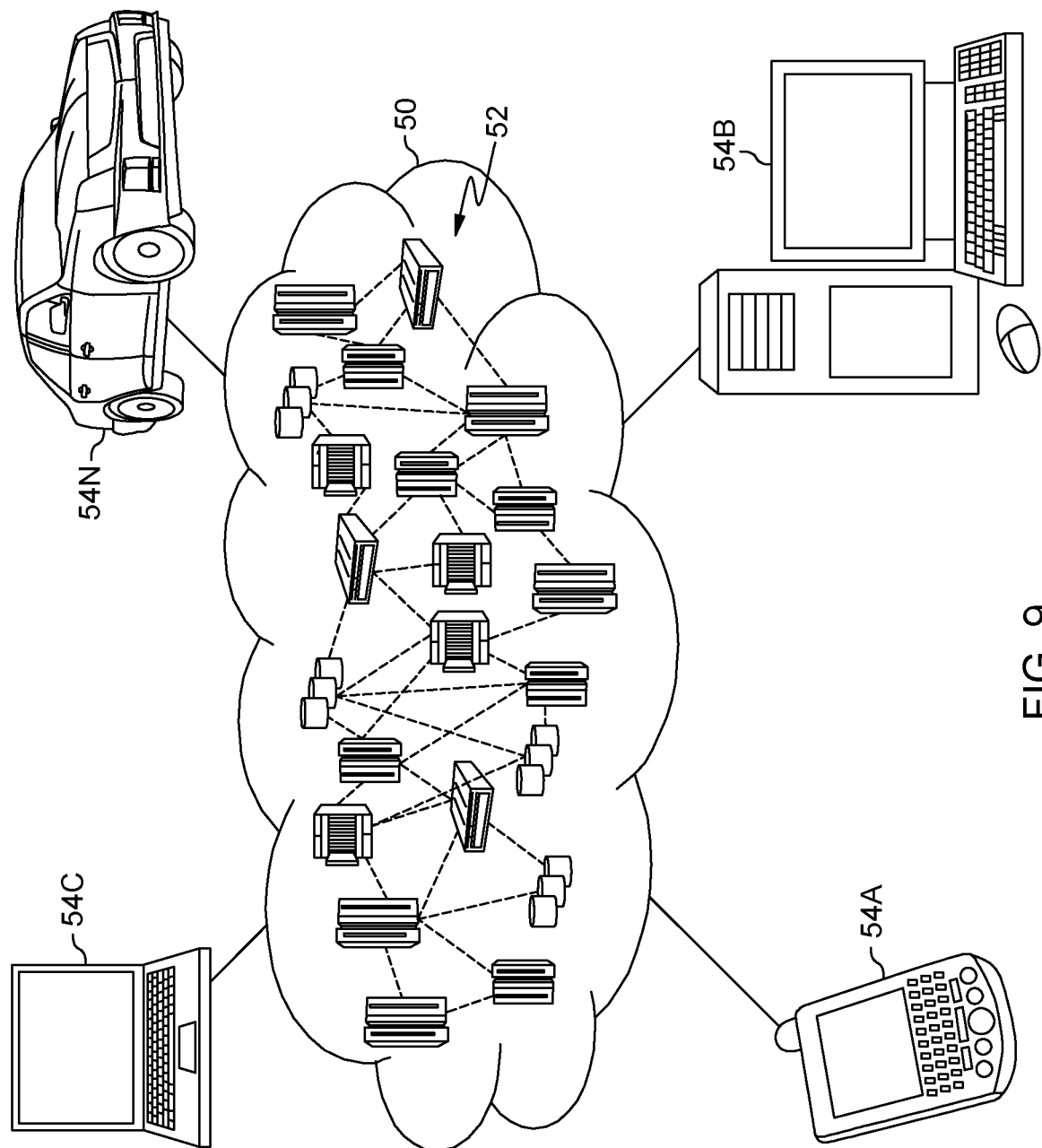
FIG. 9 depicts one embodiment of a cloud computing environment.

Referring now to FIG. 9, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 52 and cloud computing environment 50 can communicate with any type of computerized device over any type of network and/or network addressable connection (e.g., using a web browser).

Figure 10:
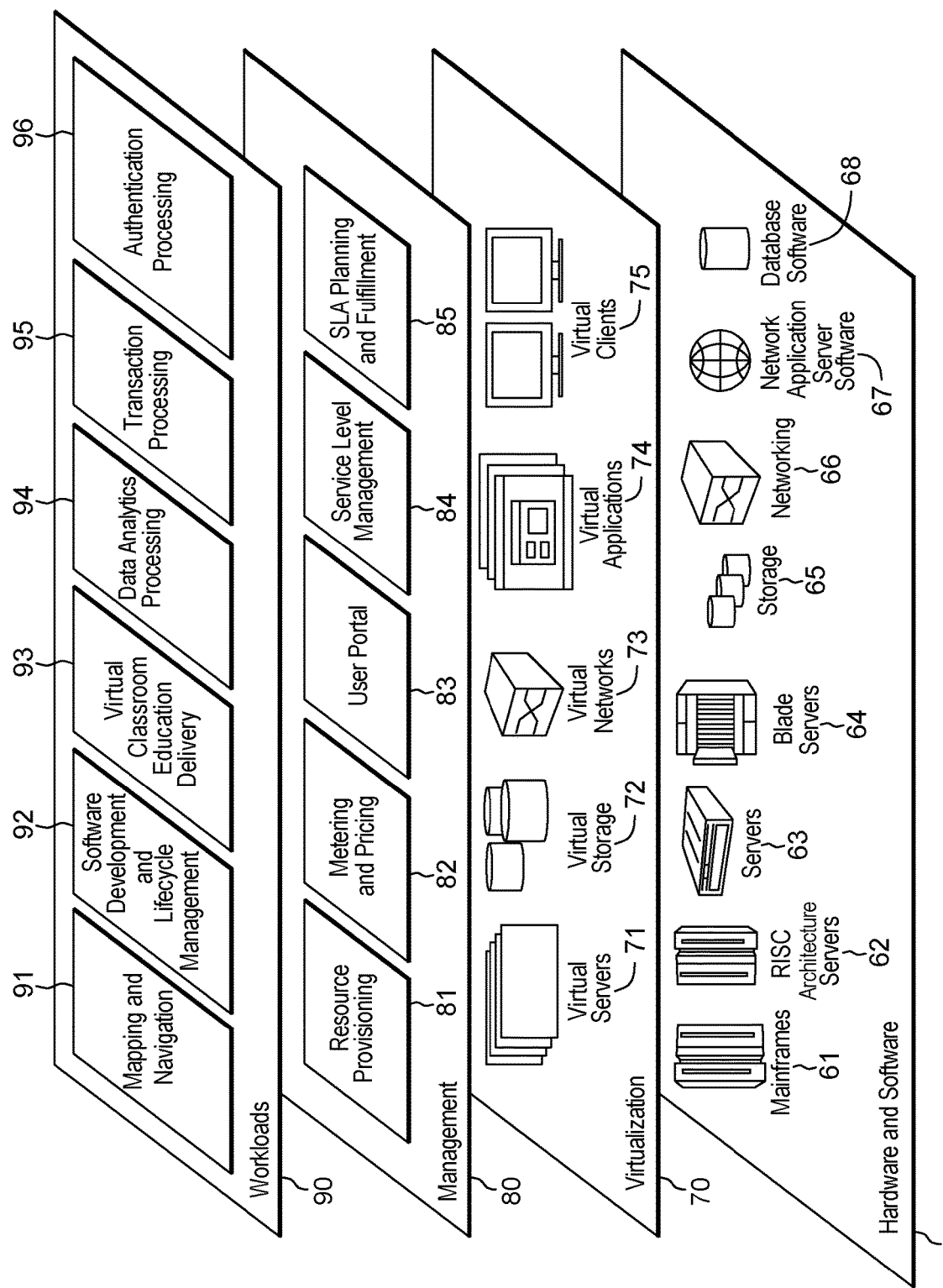
FIG. 10 depicts one example of abstraction model layers.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authentication processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, commands or operations may be used. Moreover, other security protocols, transmission protocols and/or standards may be employed. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing in a computing environment, the computer program product comprising:
    at least one computer readable storage medium readable by at least one processing circuit and storing instructions for performing a method, the method comprising:
        securing a path for one node of the computing environment, the securing the path comprising:
            obtaining, by the one node, a message, the message including an identifier of a shared key and an encrypted message, the encrypted message including a first encryption key, a second encryption key, one or more first parameters and one or more second parameters;
            obtaining, by the one node, the shared key from a key server coupled to the one node, the one node having a secure connection with the key server;
            using the shared key to decrypt the encrypted message to obtain the first encryption key, the second encryption key, the one or more first parameters and the one or more second parameters;
            obtaining a second security parameters index to be associated with the second encryption key and the one or more second parameters; and
            sending by the one node a response message to another node, the response message including the second security parameters index, wherein a secure path over a link coupling the one node and the other node is provided.

2. The computer program product of claim 1, wherein the securing the path further comprises establishing by the one node the secure connection with the key server, the establishing the secure connection using one or more certificates of authentication.

3. The computer program product of claim 2, wherein at least one certificate of authentication includes a name associated with the one node to enable the key server to trust the one node.

4. The computer program product of claim 1, wherein the one or more first parameters include a first salt and a first security parameters index.

5. The computer program product of claim 1, wherein the one or more second parameters include a second salt.

6. The computer program product of claim 5, wherein the securing the path further includes using the second encryption key and the second salt to transmit subsequent data.

7. The computer program product of claim 1, wherein the securing the path further comprises encrypting the response message using the shared key.

8. The computer program product of claim 1, wherein the securing the path further comprises receiving a reply to the response message.

9. The computer program product of claim 1, wherein the securing the path further includes using the first encryption key and the one or more first parameters to decrypt received data.

10. The computer program product of claim 1, wherein the using the shared key comprises using the shared key in a cryptographic technique to decrypt the encrypted message.

11. A computer system for facilitating processing in a computing environment, the computer system comprising:
   a memory; and
   a processor in communication with the memory, wherein the computer system is configured to perform a method, said method comprising:
      securing a path for one node of the computing environment, the securing the path comprising:
         obtaining, by the one node, a message, the message including an identifier of a shared key and an encrypted message, the encrypted message including a first encryption key, a second encryption key, one or more first parameters and one or more second parameters;
         obtaining, by the one node, the shared key from a key server coupled to the one node, the one node having a secure connection with the key server;
         using the shared key to decrypt the encrypted message to obtain the first encryption key, the second encryption key, the one or more first parameters and the one or more second parameters;
         obtaining a second security parameters index to be associated with the second encryption key and the one or more second parameters; and
         sending by the one node a response message to another node, the response message including the second security parameters index, wherein a secure path over a link coupling the one node and the other node is provided.

12. The computer system of claim 11, therein the securing the path further comprises establishing by the one node the secure connection with the key server, the establishing the secure connection using one or more certificates of authentication.

13. The computer system of claim 11, wherein the one or more first parameters include a first salt and a first security parameters index.

14. The computer system of claim 11, wherein the one or more second parameters include a second salt.

15. The computer system of claim 11, wherein the securing the path further includes using the first encryption key and the one or more first parameters to decrypt received data.

16. A computer-implemented method of facilitating processing in a computing environment, the computer-implemented method comprising:
   securing a path for a one node of the computing environment, the securing the path comprising:
      obtaining, by the one node, a message, the message including an identifier of a shared key and an encrypted message, the encrypted message including a first encryption key, a second encryption key, one or more first parameters and one or more second parameters;
      obtaining, by the one node, the shared key from a key server coupled to the one node, the one node having a secure connection with the key server;
      using the shared key to decrypt the encrypted message to obtain the first encryption key, the second encryption key, the one or more first parameters and the one or more second parameters;
      obtaining a second security parameters index to be associated with the second encryption key and the one or more second parameters; and
      sending by the one node a response message to another node, the response message including the second security parameters index, wherein a secure path over a link coupling the one node and the other node is provided.

17. The computer-implemented method of claim 16, wherein the securing the path further comprises establishing by the one node the secure connection with the key server, the establishing the secure connection using one or more certificates of authentication.

18. The computer-implemented method of claim 16, wherein the one or more first parameters include a first salt and a first security parameters index.

19. The computer-implemented method of claim 16, wherein the one or more second parameters include a second salt.

20. The computer-implemented method of claim 16, wherein the securing the path further includes using the first encryption key and the one or more first parameters to decrypt received data.

* * * * *